United States Patent
Kawamae et al.

(10) Patent No.: US 11,552,506 B2
(45) Date of Patent: Jan. 10, 2023

(54) NON-CONTACT POWER TRANSMISSION DEVICE AND NON-CONTACT POWER TRANSMISSION/RECEPTION SYSTEM

(71) Applicant: Maxell, Ltd., Kyoto (JP)

(72) Inventors: Osamu Kawamae, Kyoto (JP); Yoshinori Okada, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 16/978,371

(22) PCT Filed: Mar. 22, 2018

(86) PCT No.: PCT/JP2018/011522
§ 371 (c)(1),
(2) Date: Sep. 4, 2020

(87) PCT Pub. No.: WO2019/180895
PCT Pub. Date: Sep. 26, 2019

(65) Prior Publication Data
US 2021/0044157 A1 Feb. 11, 2021

(51) Int. Cl.
*H02J 50/60* (2016.01)
*H02J 50/80* (2016.01)
(Continued)

(52) U.S. Cl.
CPC ............. *H02J 50/60* (2016.02); *A47K 3/001* (2013.01); *H02J 50/10* (2016.02); *H02J 50/80* (2016.02); *H02J 2310/12* (2020.01)

(58) Field of Classification Search
CPC ..................................................... H02J 50/60
(Continued)

(56) References Cited

U.S. PATENT DOCUMENTS 9,893,538 B1 * 2/2018 Bell .................. H02J 50/80
2007/0132596 A1 * 6/2007 Green .................. A47K 17/00
381/71.1
(Continued)

FOREIGN PATENT DOCUMENTS

JP 2009-159684 A 7/2009
JP 2009159684 A * 7/2009 ............. A47K 3/02
(Continued)

OTHER PUBLICATIONS

International Search Report and Written Opinion dated Apr. 17, 2018 for PCT/JP2018/011522 filed on Mar. 22, 2018, 12 pages including English Translation of the International Search Report.

*Primary Examiner* — Edward Tso
*Assistant Examiner* — Ahmed H Omar
(74) *Attorney, Agent, or Firm* — Xsensus LLP

(57) ABSTRACT

Provided is non-contact power transmission/reception technique which is easy to be used while ensuring consideration for safety. A non-contact power transmission device 100 that wirelessly transfers generated transmission power to a non-contact power reception device 200 comprises a transmission power generation unit 120 configured to perform generation of the transmission power and a control unit 117 configured to control the generation of the transmission power. The control unit 117 is further configured to control the generation of the transmission power which is performed by the transmission power generation unit 120 in accordance with a surrounding environment in which at least one of the non-contact power transmission device 100 and the non-contact power reception device 200, or at least one of states of these devices.

14 Claims, 22 Drawing Sheets

(51) Int. Cl.
*H02J 50/10* (2016.01)
*A47K 3/00* (2006.01)

(58) Field of Classification Search
USPC .......................................... 320/108
See application file for complete search history.

(56) References Cited

U.S. PATENT DOCUMENTS

| | | |
|---|---|---|
| 2016/0149442 A1 | 5/2016 | Asanuma et al. |
| 2018/0136048 A1 | 5/2018 | Ozaki |
| 2019/0013700 A1 | 1/2019 | Kobayashi |

FOREIGN PATENT DOCUMENTS

| | | | | |
|---|---|---|---|---|
| JP | 2014-050127 A | | 3/2014 | |
| JP | 2014050127 A | * | 3/2014 | ................ H02J 7/00 |
| JP | 2016-054968 A | | 4/2016 | |
| JP | 2016054968 | * | 4/2016 | ............. H02J 50/00 |
| JP | 2016-136834 A | | 7/2016 | |
| WO | 2016/162940 A1 | | 10/2016 | |
| WO | 2017/141641 A1 | | 8/2017 | |

\* cited by examiner

NON-CONTACT POWER TRANSMISSION DEVICE AND NON-CONTACT POWER TRANSMISSION/RECEPTION SYSTEM

CROSS-REFERENCE TO RELATED APPLICATION

The present application is based on PCT filing PCT/JP2018/011522, filed Mar. 22, 2018, the entire contents of which is incorporated herein by reference.

TECHNICAL FIELD

The present invention relates to non-contact power transmission/reception technique for performing power transmission/reception in a non-contact manner.

BACKGROUND ART

Since non-contact power transfer does not require a metallic contact point, it is possible to prevent contact failure and leakage of electricity due to moisture, dust, etc. In addition, since it is easy to secure waterproof performance, non-contact power transfer is adopted for an electric device used in a water section.

For example, Patent Literature 1 discloses a bathtub with a non-contact power transfer function "comprising a drive control unit which includes: a drive target detection means for generating a detectable period, in which only one of a plurality of non-contact power transfer units is driven, at every predetermined time by sequentially switching the non-contact power transfer units to be driven, measuring impedance when viewing a power reception side from the currently driven non-contact power transfer unit during the detectable period, determining whether a non-contact power reception unit is disposed opposite to the non-contact power transfer unit based on the measured impedance so as to detect whether the non-contact power reception unit is disposed opposite to each non-contact power transfer unit; and a drive means for driving only the non-contact power transfer unit disposed opposite to the non-contact power reception unit" (excerpted from Abstract).

Furthermore, Patent Literature 2 discloses a display system for a non-contact power transfer system, comprising "a display unit that visually displays a piece of image information transmitted from an electric shaver as a target of non-contact power transfer. The electric shaver includes a power reception unit, an authentication information hold unit, an imaging unit, and a first wireless communication unit. A power transmission unit includes a second wireless communication unit, an authentication circuit, and a display unit. The power transmission unit is configured to transmit power when the authentication information to be received represents the electric shaver authenticated by the authentication circuit, and the display unit visually displays, in real time, image information transmitted in real time from an imaging device of the electric shaver" (excerpted from Abstract).

CITATION LIST

Patent Literature

Patent Literature 1: JP 2009-159684 A
Patent Literature 2: JP 2014-50127 A

SUMMARY OF INVENTION

Technical Problem

According to Patent Literature 1, a non-contact power transfer unit on which an electric device to be supplied with power is installed is detected among from a plurality of non-contact power transfer units, thereby suppressing unnecessary power consumption and thus saving energy. According to Patent Literature 2, it is possible to improve convenience of an electric device which is a target of non-contact power transfer. However, both Literatures do not consider safety.

For example, when a metallic foreign substance such as a metal piece exists in a wireless power transfer area, there is a possibility that the metallic foreign substance generates heat under an influence of the wireless power transfer power. In addition, as described above, the non-contact power transfer has been increasingly applied to electric devices around a water section. When using an electrical device around the water section, for example, deterioration of waterproof insulation performance tends to proceed.

The present invention has been made in view of the circumstances described above, and an object thereof is to provide non-contact power transmission/reception technique which is easy to be used while ensuring consideration for safety.

Solution to Problem

According to the present invention, it is provided a non-contact power transmission device that wirelessly transfers generated transmission power to a non-contact power reception device, the non-contact power transmission device including: a transmission power generation unit configured to perform generation of the transmission power; and a control unit configured to control the generation of the transmission power which is performed by the transmission power generation unit, wherein the control unit is further configured to control the generation of the transmission power which is performed by the transmission power generation unit in accordance with a surrounding environment in which at least one of the non-contact power transmission device and the non-contact power reception device, or at least one of a state of the non-contact power transmission device and a state of the non-contact power reception device.

Furthermore, according to the present invention, it is provided a non-contact power transmission/reception system including: the non-contact power transmission device described above; and the non-contact power reception device, wherein the non-contact power reception device includes a battery that is charged with transmission power transferred from the non-contact power transmission device; and a battery level detection unit configured to detect a battery level of the battery, and when the battery level is equal to or lower than a predetermined threshold, transmit a low battery level signal to the non-contact power transmission device, and wherein the control unit of the non-contact power transmission device is configured to make the transmission power generation unit generate the transmission power in a case of receiving the low battery level signal.

Advantageous Effects of Invention

By using the technique according to the present invention, it is possible to provide a non-contact power transmission/reception technique which is easy to be used while ensuring consideration for safety. The problems, configurations, and effects other than those described above will be clarified by explanation of the embodiments below.

DESCRIPTION OF EMBODIMENTS

Hereinafter, embodiments of the present invention will be described with reference to the drawings. In the following description, components having the same functions are provided with the same reference signs unless otherwise specified, and repetitive explanation thereof will be omitted.

First Embodiment

Figure 1:
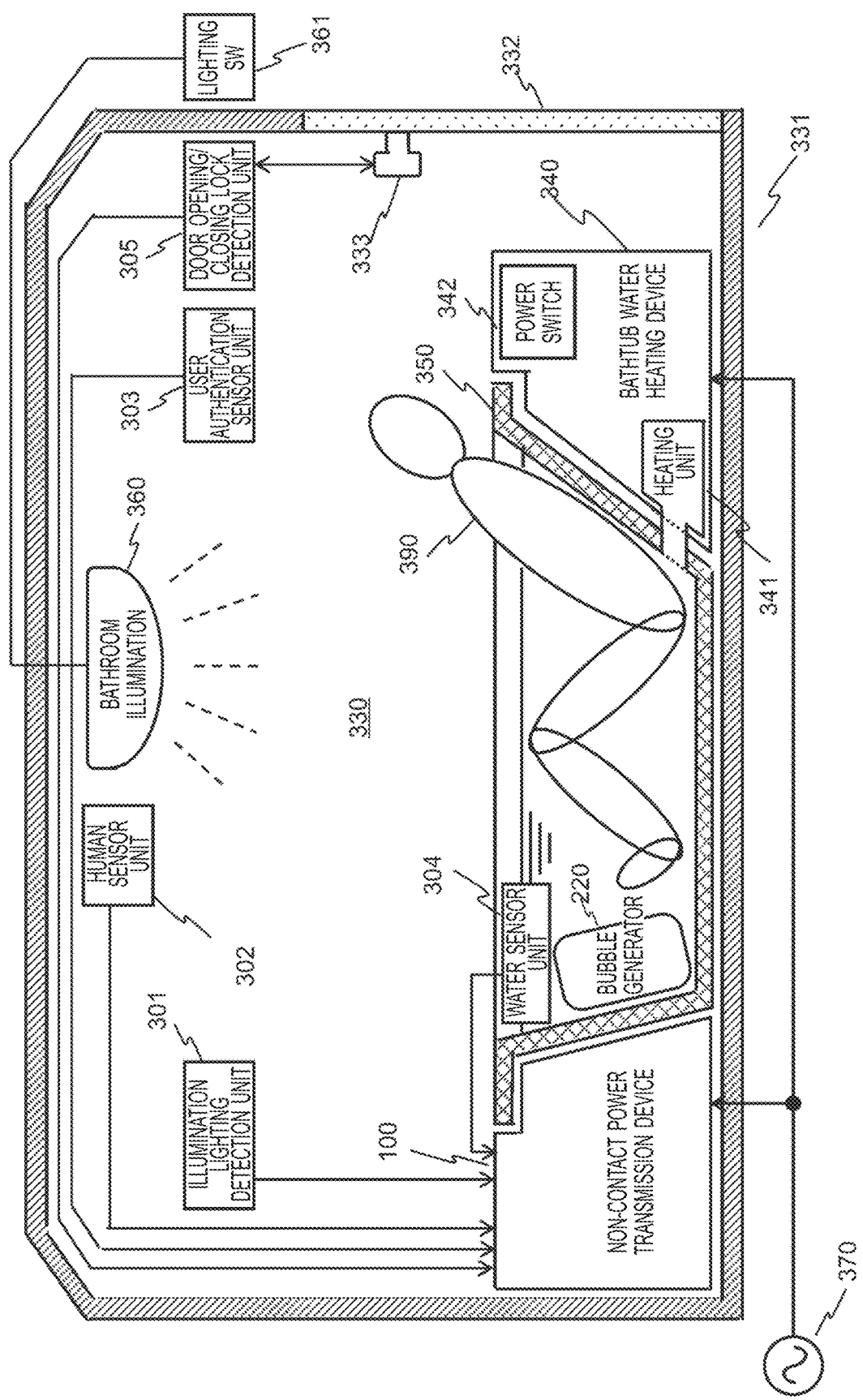
FIG. 1 explains an example of use of a non-contact power transmission/reception system according to a first embodiment.

First, an example of use of a non-contact power transmission/reception system 101 according to a first embodiment of the present invention will be described. FIG. 1 illustrates an example of use when the non-contact power transmission device 100 according to the present embodiment supplies power to a bubble generator 220 disposed as a non-contact power reception device 200 in a bathtub 350 of a bathroom 330.

[Non-Contact Power Transmission System]

The non-contact power transmission/reception system 101 according to the present embodiment includes a non-contact power transmission device 100, the bubble generator 220 which is the non-contact power reception device 200, and various detection units for detecting a state in the bathroom 330. In the present embodiment, as the detection units, an illumination lighting detection unit 301, a human sensor unit 302, a user authentication sensor unit 303, a water sensor unit 304, and a door opening/closing lock detection unit 305 are provided. Each of these detection units is disposed in the bathroom 330.

The non-contact power transmission device 100 generates transmission power by using an AC power source which receives power supplied from a commercial power source 370, and wirelessly transfers the power (non-contact power transfer) to the non-contact power reception device 200 (bubble generator 220). In the present embodiment, the non-contact power transmission device 100 is disposed, for example, in the bathroom 330, and configured to control generation of transmission power in response to detection signals from the various detection units disposed in the bathroom 330.

The bubble generator 220 is disposed in the bathtub 350 to be immersed in water in a non-contact state with the non-contact power transmission device 100. The bubble generator 220 is configured to perform functional operations by the power wirelessly transferred from the non-contact power transmission device 100. It may be configured that the power wirelessly transferred is once charged into an internal battery of the bubble generator 220 so as to allow the bubble generator 220 to perform the functional operations by using a battery power source.

The bubble generator 220 according to the present embodiment performs, for example, a functional operation of generating bubbles in the water in the bathtub 350. The bubbles generated by the bubble generator 220 enhance cleaning of pores of the human body and retention of heat/moisture.

The illumination lighting detection unit 301 is configured to detect lighting of a bathroom illumination 360 provided in the bathroom 330. Upon detection of the lighting of the bathroom illumination 360, the illumination lighting detection unit 301 generates an illumination lighting detection signal and transmits it to the non-contact power transmission device 100. In the present embodiment, as the illumination lighting detection unit 301, for example, an illuminance sensor is used. In the present embodiment, the illumination lighting detection unit 301 detects illuminance around the illuminance sensor at predetermined time intervals, and when the illuminance near the illuminance sensor is equal to or greater than a predetermined value, outputs the illumination lighting detection signal.

The bathroom illumination 360 is provided on, for example, a ceiling portion of a bathroom wall surface 331. The bathroom illumination 360 is turned on/off by a lighting switch (SW) 361 disposed outside the bathroom 330 and near a bathroom door 332. Accordingly, when the illumination lighting detection unit 301 can be interlocked with the lighting SW 361, it may be configured to determine the lighting or lighting off based on an ON/OFF operation signal by the lighting SW 361 and output the illumination lighting detection signal.

The human sensor unit 302 is configured to detect the presence or absence of a person 390 in the bathroom 330. The human sensor unit 302 determines the presence or absence of the person 390 in the bathroom 330 at predetermined time intervals, and when detecting the presence of the person 390, generates a human detection signal, and transmits it to the non-contact power transmission device 100. The human sensor unit 302 detects the presence or absence of the person 390 by using, for example, infrared rays, ultrasonic waves, and visible light.

The user authentication sensor unit 303 is configured to perform personal authentication and transmit a result thereof to the non-contact power transmission device 100 as a personal authentication signal. The personal authentication signal includes information indicating success or failure of the authentication. The personal authentication is performed by using, for example, a fingerprint, the retina of an eye, and facial appearance.

The water sensor unit 304 is configured to detect whether the bubble generator 220 is immersed in the water. When detecting that the bubble generator 220 is immersed in the water, the water sensor unit 304 generates a water immersion detection signal and transmits it to the non-contact power transmission device 100. Furthermore, the water sensor unit 304 may be configured to detect temperature of the water in the bathtub 350 and transmit it to the non-contact power transmission device 100 as a water temperature detection signal.

The door opening/closing lock detection unit 305 is configured to detect opening/closing and locking of the bathroom door 332 via a door knob 333. The door opening/closing lock detection unit 305 transmits a door opening/closing detection signal when detecting opening/closing of the bathroom door 332, transmits a lock detection signal when detecting that the bathroom door 332 is locked, in other words, detecting a locking operation, and transmits an unlock detection signal when detecting that the bathroom door 332 is unlocked, in other words, detecting an unlocking operation, respectively to the non-contact power transmission device 100.

The bathroom 330 may further include a bathtub water heating device 340 for heating the water in the bathtub 350. The bathtub water heating device 340 includes a power switch 342 and a heating unit 341. In the same manner as the non-contact power transmission device 100, the bathtub water heating device 340 is supplied with AC power from the commercial power source 370, and heats the water in the bathtub 350 to a desired temperature by means of the heating unit 341.

It should be noted that all the detection units described above are not necessarily provided, but only necessary detection units may be provided in accordance each control processing.

[Non-Contact Power Transmission Device]

Figure 2:
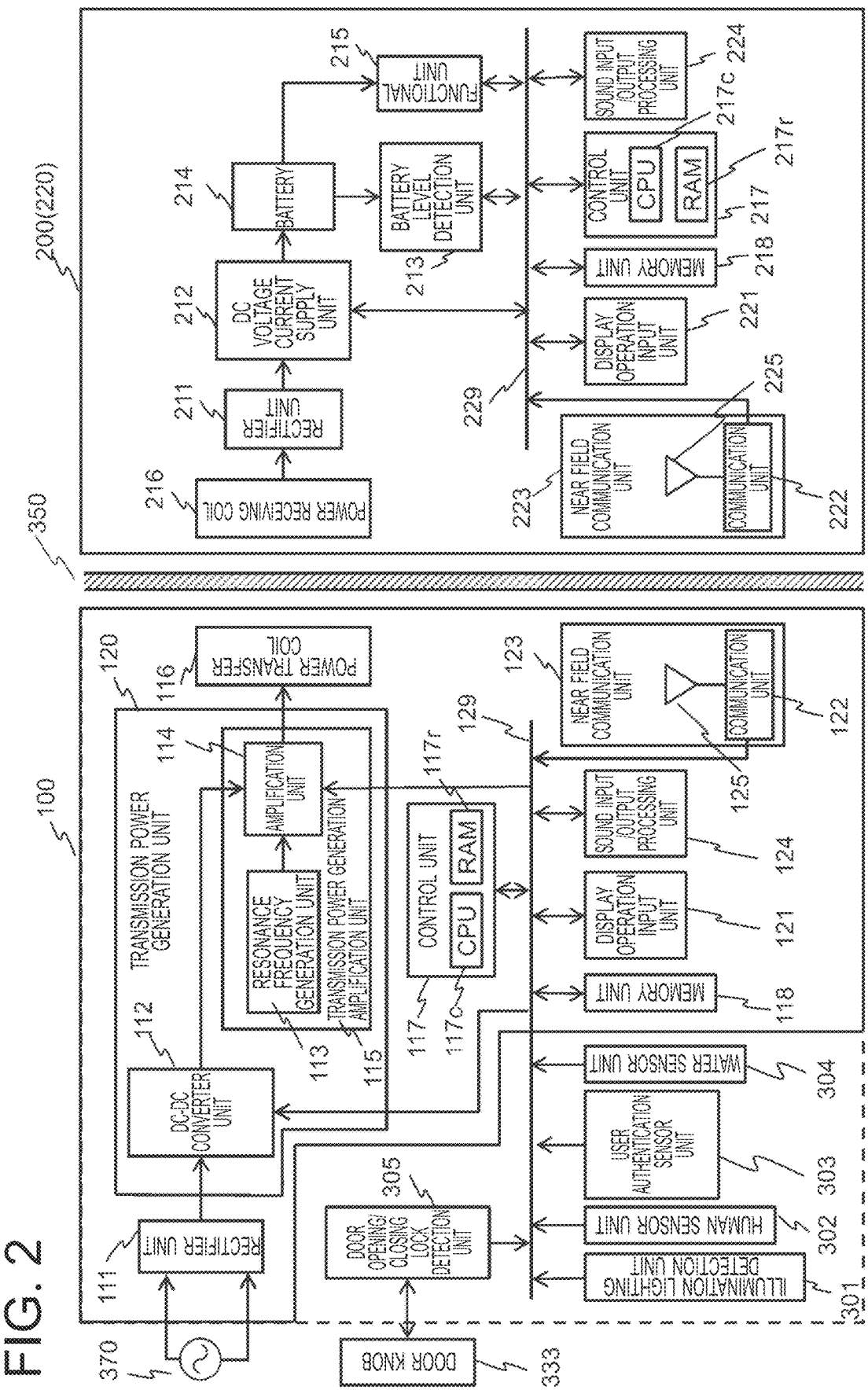
FIG. 2 is a configuration diagram of a non-contact power transmission/reception system according to a first embodiment.

As described above, the non-contact power transmission device 100 according to the present embodiment is supplied with AC power from the commercial power source 370, and generates transmission power to be supplied to the bubble generator 220 in response to detection signals from each of the detection units. FIG. 2 illustrates the configuration of the non-contact power transmission/reception system 101 according to the present embodiment for realizing the above.

As illustrated in FIG. 2, the non-contact power transmission device 100 according to the present embodiment includes a rectifier unit 111, a transmission power generation unit 120, a power transfer coil 116, a control unit 117, a memory unit 118, a display operation input unit 121, a sound input/output processing unit 124, a near field communication unit 123, and a bus 129.

The transmission power generation unit 120 includes a DC-DC converter unit 112 and a transmission power generation amplification unit 115. The transmission power generation amplification unit 115 includes a resonance frequency generation unit 113 and an amplification unit 114. The near field communication unit 123 includes a communication unit 122 and a transmission/reception antenna 125. Each constituent unit, excluding the rectifier unit 111 and the power transfer coil 116, is connected to each other via the bus 129.

The state detection units such as the illumination lighting detection unit 301, the human sensor unit 302, the user authentication sensor unit 303, the water sensor unit 304, and the door opening/closing lock detection unit 305 are also connected to the bus 129.

The AC power from the commercial power source 370 is rectified by the rectifier unit 111, supplied to the DC-DC converter unit 112, and then converted to DC power transfer voltage by the DC-DC converter unit 112. The DC-DC converter unit 112 is configured to perform control so as to selectively output the DC power transfer voltage from the DC-DC converter unit 112 in response to an instruction output from the control unit 117, and supply it as a power source for the amplification unit 114 in the transmission power generation amplification unit 115.

The resonance frequency generation unit 113 in the transmission power generation amplification unit 115 is configured to generate a clock signal having a resonance frequency of magnetic field resonance coupling type wireless power transfer, and output it to the amplification unit 114. The amplification unit 114 amplifies the clock signal from the resonance frequency generation unit 113 in response to the DC power transfer voltage from the DC-DC converter unit 112, and supplies it to the power transfer coil 116 as transmission power.

The control unit 117 includes a CPU 117c and a RAM 117r. The CPU 117c loads a program stored in the memory unit 118 into the RAM 117r and executes the program, thereby controlling each unit of the non-contact power transmission device 100. For control processing, data stored in the memory unit 118 in advance and signals acquired from each of the detection units and other constituent units via the bus 129 are used.

For example, the control unit 117 controls a power transmission operation in the non-contact power transmission device 100, by using information stored in the memory unit 118, in response to input/output signals from the illumination lighting detection unit 301, the human sensor unit 302, the user authentication sensor unit 303, the water sensor unit 304, the door opening/closing lock detection unit 305, the display operation input unit 121, the sound input/output processing unit 124, and the near field communication unit 123. Details of the control processing performed by the control unit 117 will be described later.

The memory unit 118 is a flash memory, etc., and is configured to store a program used by the control unit 117, various types of information set and input by the display operation input unit 121, etc. The various types of information stored therein are, for example, power reception device recognition information (identification information) indicating that the installed bubble generator 220 is a device with which power is transferred wirelessly from the non-contact power transmission device 100, and personal authentication information generated by personal authentication of the user. The information above is used in other embodiments which will be described later.

The display operation input unit 121 includes a liquid crystal panel, etc., and is configured to display an operation state of the non-contact power transmission device 100. The operation state to be displayed thereon includes, for example, power ON/OFF and power modes of transmission power. In addition, the display operation input unit 121 accepts an input by the user via a display surface of the liquid crystal panel. The input to be accepted includes, for example, an operation input such as turning on the power of the non-contact power transmission device, and a preliminary registration input of such as the power reception device recognition information and the personal authentication information.

The near field communication unit 123 is configured to be controlled by the control unit 117 so as to perform transmission/reception of information with the bubble generator 220 in a range in which near field communication can be performed. The near field communication is performed by using, for example, an electronic tag. Meanwhile, the present invention is not limited thereto, and can use various methods and techniques of the near field communication. For example, Bluetooth (registered trademark), IrDA (Infrared Data Association), Zigbee (registered trademark), HomeRF (Home Radio Frequency, registered trademark), or radio LAN (IEEE802.11a, IEEE802.11b, IEEE802.11g) may be used.

The sound input/output processing unit 124 is configured to perform processing of sound input/output to or from the non-contact power transmission device 100. The sound input/output processing unit 124 includes, for example, a microphone for inputting external sound and a speaker for outputting sound to the outside. In the present embodiment, the sound input/output processing unit 124 outputs various alarms by sound in accordance with an instruction from the control unit 117.

[Non-Contact Power Reception Device (Bubble Generator)]

Next, the configuration of the bubble generator 220 serving as the non-contact power reception device 200 will be described. As illustrated in FIG. 2, the bubble generator 220 according to the present embodiment includes a power receiving coil 216, a rectifier unit 211, a DC voltage current supply unit 212, a battery level detection unit 213, a battery 214, a functional unit 215, a control unit 217, a memory unit 218, a display operation input unit 221, a near field communication unit 223, and a sound input/output processing unit 224. The near field communication unit 223 includes a communication unit 222 and a transmission/reception antenna 225. Each unit, excluding the power receiving coil 216, the rectifier unit 211 and the battery 214, is connected to each other via a bus 229.

In the bubble generator 220, transmission power supplied from the power transfer coil 116 is received by the power receiving coil 216, and rectified by the rectifier unit 211 into a direct current. Thereafter, the voltage is stabilized by the DC voltage current supply unit 212, and an output current corresponding to the received power is supplied to the battery 214 to charge the battery 214.

The functional unit 215 is configured to generate bubbles in water by using the power supplied from the battery 214.

The control unit 217 includes a CPU 217c and a RAM 217r. The CPU 217c loads an operation program stored in the memory unit 218 into the RAM 217r and executes the program, thereby controlling each unit and performing various kinds of processing.

The memory unit 218 is a flash memory, etc., and is configured to store various programs used by the control unit 217 and information such as power reception device recognition information set and input by the display operation input unit 221.

The display operation input unit 221 includes a liquid crystal panel, etc., and is configured to display an operation state of the bubble generator 220. The operation state to be displayed thereon includes, for example, power ON/OFF. In addition, the display operation input unit 221 accepts an input by the user via a display surface of the liquid crystal panel. The input to be accepted includes, for example, an operation input such as turning on the power of the bubble generator 220 and a preliminary registration input of such as the power reception device recognition information.

The near field communication unit 223 has the same configuration as the near field communication unit 123. The near field communication unit 223 is configured to be controlled by the control unit 217, and perform transmission/reception of information such as the power reception device recognition information with the non-contact power transmission device 100 in a range in which near field communication can be performed.

The battery level detection unit 213 is configured to detect a battery level of the battery 214 and generate a battery level detection signal. The control unit 217 transmits the battery level detection signal to the non-contact power transmission device 100 via the near field communication unit 223. The non-contact power transmission device 100 receives the battery level detection signal via the near field communication unit 223, and controls transmission power in accordance with the received battery level detection signal.

The battery level detection signal may be transmitted to the non-contact power transmission device 100, for example, each time it is detected, or when a battery level reaches a predetermined level. Specifically, examples of the case where the battery 214 is fully charged and the case where a predetermined threshold is reached, etc. are included.

[Functional Block]

The functions of the control unit 117 of the non-contact power transmission device 100 will be described. In the present embodiment, when there is a high possibility that the person 390 is present around the non-contact power transmission device 100, generation of transmission power is started. In other words, when it is determined that the non-contact power transmission device 100 is disposed in such an environment, generation of transmission power is started.

Specifically, upon detecting that the person 390 is in the bathroom 330, the control unit 117 according to the present embodiment provides the transmission power generation unit 120 with an instruction to start generating transmission power. In addition, upon receiving a full charge signal via the near field communication unit 123, the control unit 117 provides the transmission power generation unit 120 with an instruction to stop generating the transmission power.

Figure 3:
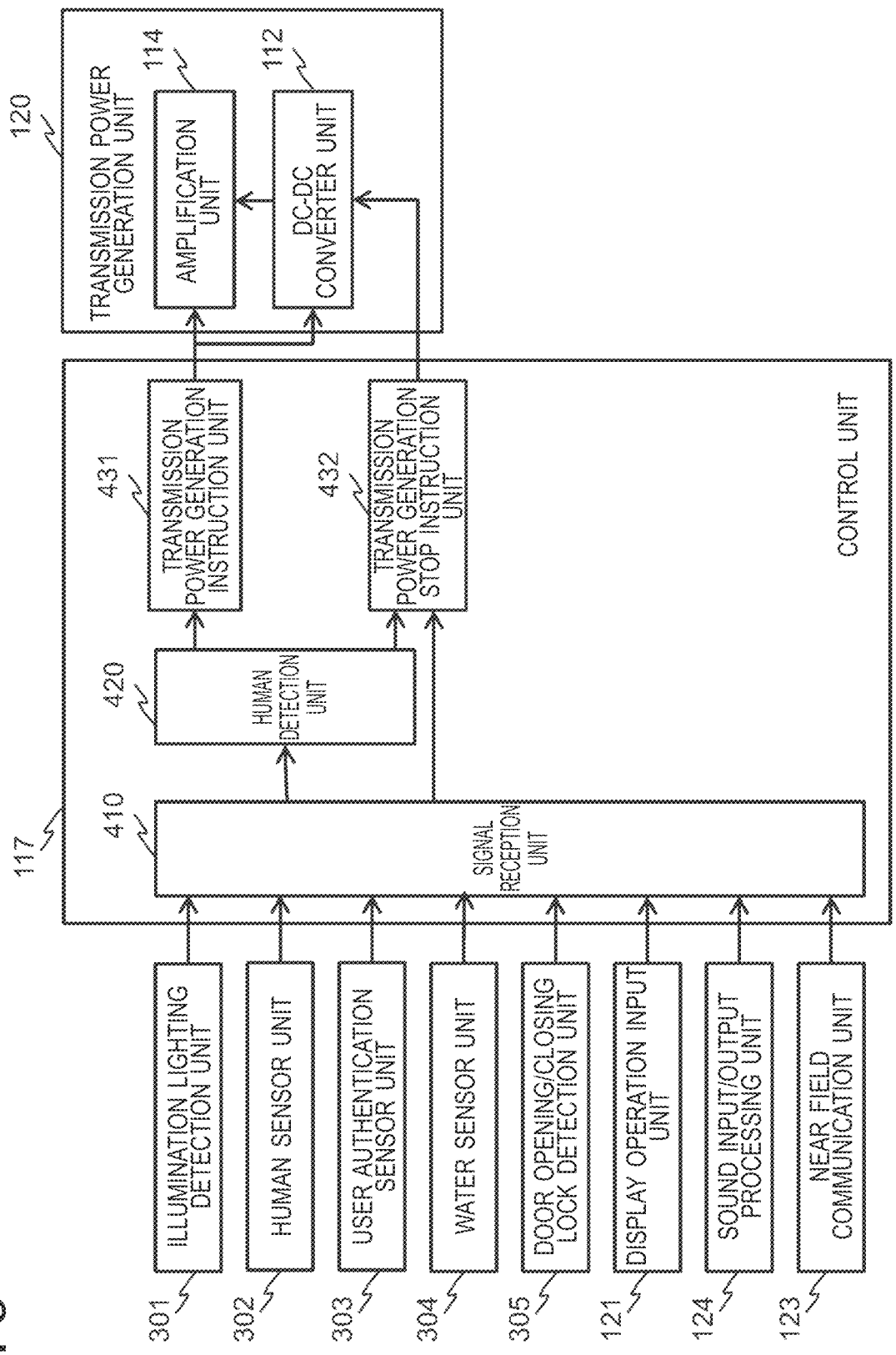
FIG. 3 is a function block diagram of a control unit of a non-contact power transmission device according to a first embodiment.

To realize the above, as illustrated in FIG. 3, the control unit 117 according to the present embodiment includes a signal reception unit 410, a human detection unit 420, a transmission power generation instruction unit 431, and a transmission power generation stop instruction unit 432.

The signal reception unit 410 is configured to receive signals from each detection unit, and output them to each function of the control unit 117. In the present embodiment, the signal reception unit 410 outputs a human detection signal from the human sensor unit 302 to the human detection unit 420. In addition, in the present embodiment, upon receiving the battery level detection signal from the bubble generator 220, the signal reception unit 410 outputs it to the transmission power generation stop instruction unit 432 via the near field communication unit 123.

The human detection unit 420 is configured to receive signals from each detection unit, and detect (determine) whether the person 390 is in the bathroom 330 (presence, absence). In the present embodiment, upon receiving the human detection signal from the human sensor unit 302, the human detection unit 420 determines that the person 390 is in the bathroom 330. When determining the presence of the person 390, the human detection unit 420 makes the transmission power generation instruction unit 431 start generating transmission power.

Upon receiving a presence detection signal from the human detection unit, the transmission power generation instruction unit 431 provides the transmission power generation unit 120 with an instruction to generate the transmission power. In the present embodiment, the transmission power generation instruction unit 431 instructs the DC-DC converter unit 112 to output power at a predetermined DC power transfer voltage. In addition, the transmission power generation instruction unit 431 makes the amplification unit 114 amplify a clock signal output from the resonance frequency generation unit 113 at a predetermined amplification factor, and provides it to the power transfer coil 116.

The transmission power generation stop instruction unit 432 provides the transmission power generation unit 120 with an instruction to stop generating the transmission power. In the present embodiment, when receiving a battery level detection signal indicating that the battery 214 is fully charged via the signal reception unit 410, the transmission power generation stop instruction unit 432 provides an instruction to stop generating the transmission power.

[Transmission Power Generation Processing]

Figure 4:
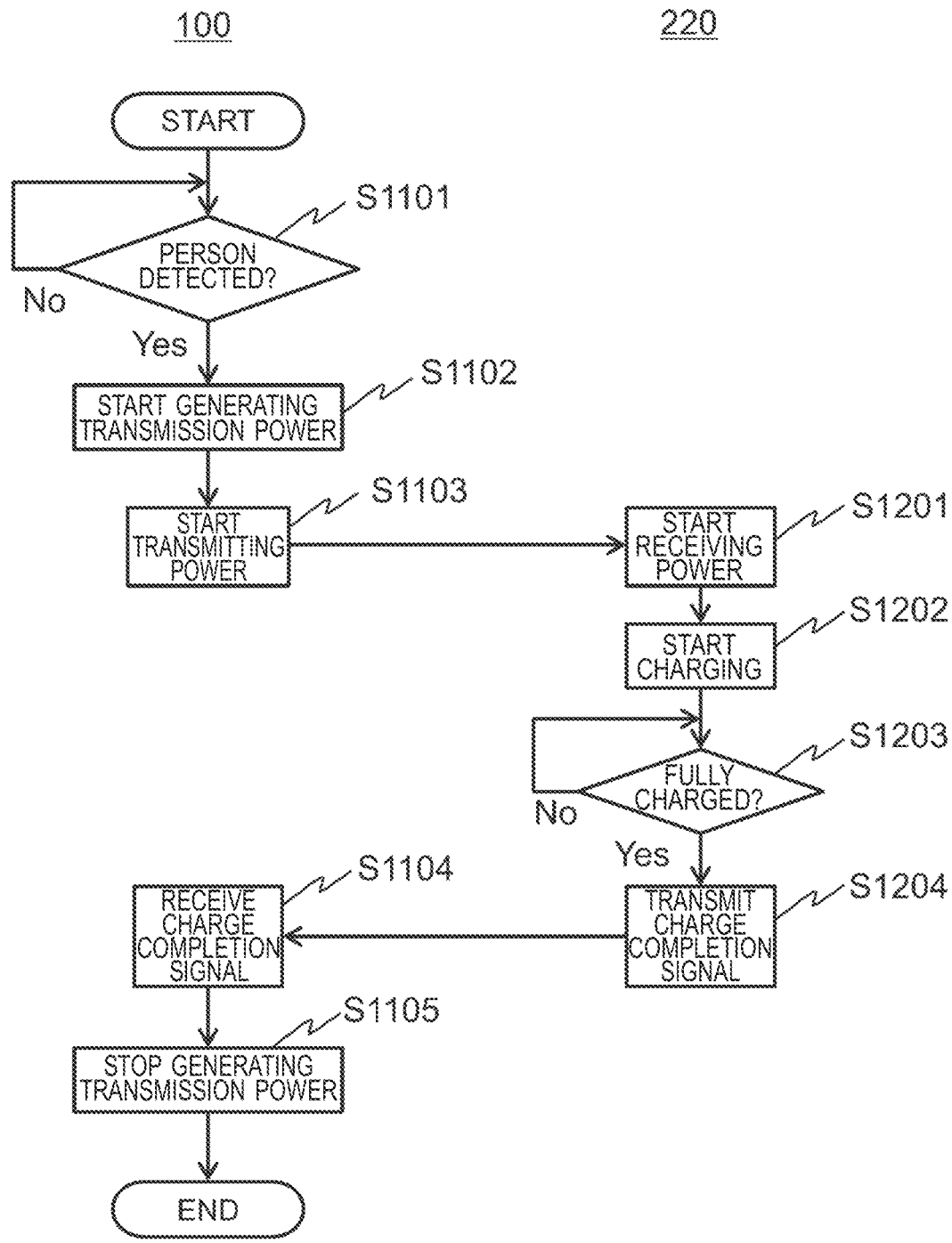
FIG. 4 illustrates a flowchart of transmission power generation processing according to a first embodiment.

Hereinafter, a transmission power generation processing flow performed by the control unit 117 according to the present embodiment will be described. FIG. 4 illustrates a processing flow of the transmission power generation processing according to the present embodiment. The transmission power generation processing starts when the non-contact power transmission device 100 is activated.

In the following, it is configured that the battery level detection signal is not transmitted every time the battery level is detected, but is transmitted to the non-contact power transmission device 100 when the battery 214 is fully charged. Accordingly, hereinafter, processing at the bubble generator 220 side, which is performed when being supplied with the transmission power, will also be described.

The human detection unit 420 determines whether the person 390 is detected in the bathroom 330 (step S1101). In the present embodiment, the human detection unit 420 determines whether a human detection signal has been received via the signal reception unit 410. When not receiving the human detection signal, the human detection unit 420 stands by as it is and continues to monitor the human detection signal.

On the other hand, when the person 390 is detected (step S1101; Yes), in other words, when receiving a presence detection signal, the human detection unit 420 transmits the presence detection signal to the transmission power generation instruction unit 431 and provides an instruction thereto to start generating transmission power.

Upon receiving the presence detection signal, the transmission power generation instruction unit 431 makes the transmission power generation unit 120 start generating transmission power (step S1102). The generated transmission power is transmitted to the bubble generator 220 via the power transfer coil 116. That is, the power transfer coil 116 starts transferring the transmission power (step S1103).

At the bubble generator 220 side, the power receiving coil 216 starts receiving the transmission power (step S1201). Then, the control unit 217 starts charging the battery 214 with the received power (step S1202).

During charging, the battery level detection unit 213 monitors a charging state of the battery 214. When the battery 214 is fully charged (step S1203), the battery level detection unit 213 transmits, charged as a battery level detection signal, a charge completion signal indicating that the battery is fully (step S1204).

When receiving the charge completion signal via the near field communication unit 123 (step S1104), the signal reception unit 410 transmits the charge completion signal to transmission power generation stop instruction unit 432. Upon receiving the signal, the transmission power generation stop instruction unit 432 provides the transmission power generation unit 120 with an instruction to stop generating the transmission power (step S1105), and the processing is ended.

As described above, according to the present embodiment, only when it is determined that there is a high possibility that the person 390 is in the bathroom 330, the non-contact power transmission device 100 is operated so as to transmit power to the bubble generator 220 which serves as the non-contact power reception device 200. In other words, only when the person 390 is likely to be near the non-contact power transmission device 100, power transmission is performed.

With this configuration, in the present embodiment, the person 390 can confirm the surrounding environment before the non-contact power transmission device 100 generates and transmits power. The non-contact power transmission device 100 is operated only when a monitoring person is likely to be therearound, and accordingly, it is possible to prevent a foreign object or an unexpected object from being charged. In other words, generation of heat and/or ignition due to charging of a foreign object or an unexpected object can be prevented from occurring. As an unexpected foreign object, for example, an IC card is included.

Furthermore, the person 390 can also confirm a state of the non-contact power reception device 200 used in the bathroom 330. Accordingly, for example, when the non-contact power reception device 200 is used in an environment including a water section such as the bathroom 330, the person 390 can also confirm whether waterproof insulating performance is deteriorated before power transfer. In this way, according to the present embodiment, it is possible to provide the non-contact power transmission/reception system 101 with high safety.

Still further, according to the present embodiment, it is possible to wirelessly transfer power to the battery 214 regardless of an operation of the functional unit 215 of the bubble generator 220. After a charging operation is started, even when an operation of the functional unit 215 of the bubble generator 220 is stopped, the charging operation is continued until the charging operation is completed. In this way, the operation of the functional unit 215 is always started from a fully charged state of the battery 214, and accordingly, it is possible to further improve the convenience.

Still further, while charging is performed in the bathroom 330, it is possible to continue to use the operation of the functional unit 215 of the bubble generator 220. Since shortage of the battery 214 does not occur at the bubble generator 220, the functional operation of the bubble generator 220 can be used continuously for a long time while a user is in the bathroom 330. In this way, according to the present embodiment, while ensuring safety, it is possible to realize the non-contact power transmission/reception system 101 with high usability.

In this connection, the control unit 117 may be configured to measure a time from start of power transmission, and stop generating transmission power when not receiving the charge completion signal even after a predetermined period has elapsed. With this configuration, even when there is a malfunction in the battery level detection function at the non-contact power reception device 200 side, it is possible to prevent excessive charging, thereby providing the non-contact power transmission/reception system 101 with higher safety.

In addition, the control unit 117 may be configured to notify that the charging is completed when stopping the generation of the transmission power after receiving the charge completion signal from the bubble generator 220. The notification is performed, for example, by displaying to at least one of the display operation input unit 121 of the non-contact power transmission device 100 and the display operation input unit 221 of the non-contact power reception device 200, and/or sound input/output from at least one of the sound input/output processing unit 124 and sound input/output processing unit 224, etc.

<First Modification>

In the embodiment described above, the present invention is configured to detect the presence or absence of the person 390 at the start, and thereafter, continue to transmit power until the battery 214 is fully charged even when the person 390 is absent. Meanwhile, the present invention is not limited to the embodiment described above. For example, after the start of power transmission, it may be configured to always monitor the presence or absence of the person 390 near the non-contact power transmission device 100, and stop transmitting the power when there is a high possibility that the person 390 is absent.

In the following, functions of each unit and a processing flow according to the present modification will be described.

In the present modification, the human detection unit 420 is configured to determine that the person 390 is absent in the bathroom 330 when not receiving a human detection signal further for a predetermined period. Then, the human detection unit 420 outputs an absence detection signal to the transmission power generation stop instruction unit 432.

In accordance therewith, the transmission power generation stop instruction unit 432 provides an instruction to stop generating transmission power also when receiving the absence detection signal from the human detection unit 420.

Figure 5:
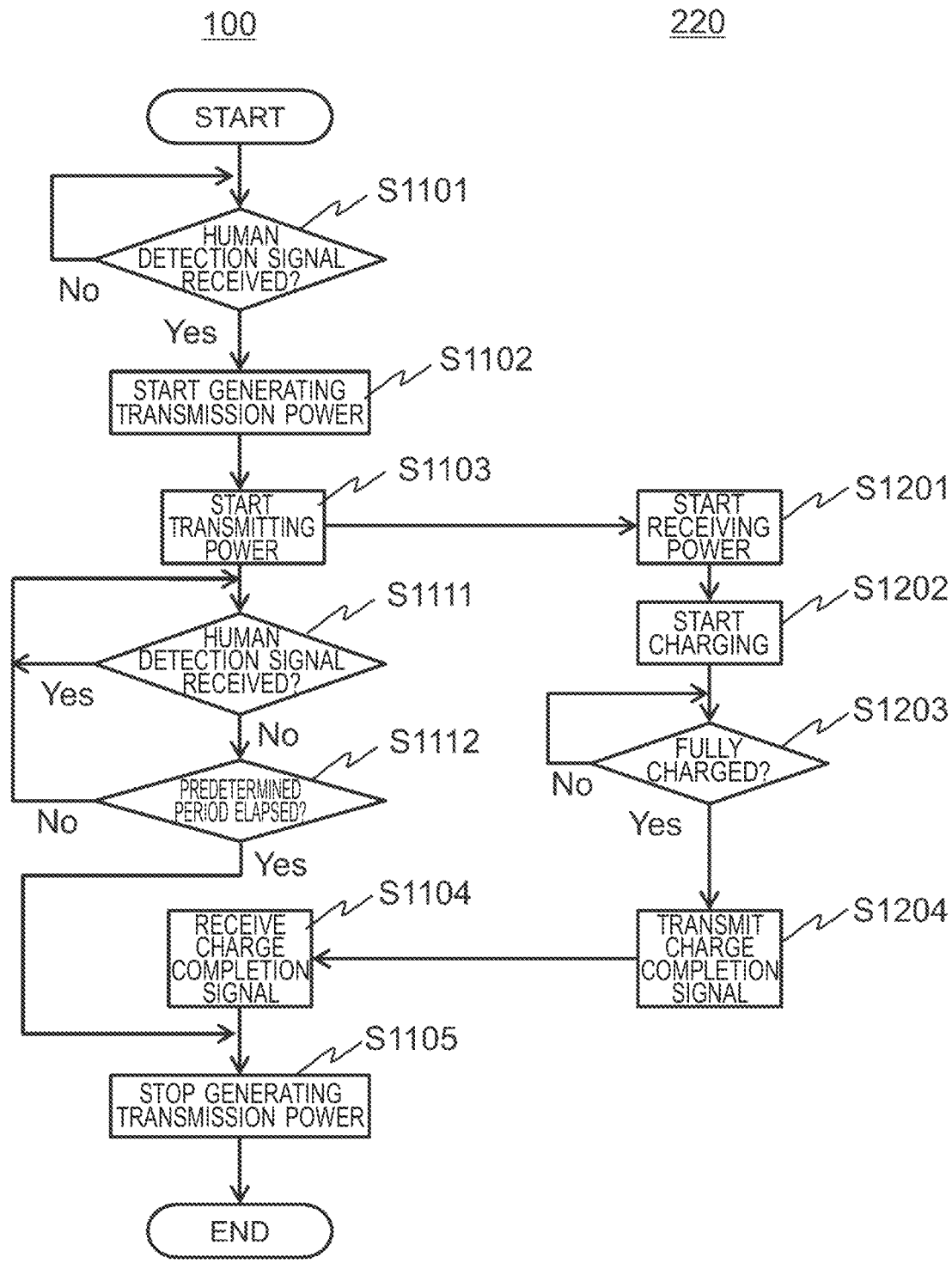
FIG. 5 illustrates a flowchart of transmission power generation processing according to a first modification of a first embodiment.

A transmission power generation processing flow performed by the control unit 117 according to the present modification will be described with reference to FIG. 5. In the present processing flow, the same reference signs are provided with the same processes as those in the embodiment described above with reference to FIG. 4, and repetitive explanation thereof will be omitted. In the same manner as the first embodiment, in the present modification, the transmission power generation processing starts when the non-contact power transmission device 100 is activated. In the following, it is configured that the battery level detection signal is transmitted to the non-contact power transmission device 100 when the battery 214 is fully charged.

The flow of processing until power transmission is started (steps S1101 to S1103) and the processes at the bubble generator 220 side (steps S1201 to 1204) are the same as those in the embodiment described above.

After the start of power transmission, the human detection unit 420 monitors reception of a human detection signal from the human sensor unit 302 (step S1111). Then, when not receiving the human detection signal, the human detection unit 420 determines whether a predetermined period has elapsed in a state of not receiving the signal (step S1112). When the predetermined time is not elapsed, the human detection unit 420 continues to monitor the human detection signal. On the other hand, when the predetermined time is elapsed, the human detection unit 420 outputs an absence signal to the transmission power generation stop instruction unit 432, and the processing proceeds to step S1105.

As described above, according to the present modification, the present invention is configured to, after the start of power transmission, constantly monitor the presence or absence of the person 390 near the non-contact power transmission device 100, and when the possibility that the person 390 is absent is increased, stop transmitting power. As a result, it is possible to wirelessly transfer power to the bubble generator 220 while monitoring the safety in a state of being watched by the user. In addition, since power transmission is stopped when the person 390 who monitors the power transmission performed by the non-contact power transmission device 100 is absent, it is possible to realize a non-contact power transmission/reception system with higher safety.

<Second Modification>

In the embodiment described above, the human sensor unit 302 detects the presence or absence of the person 390 in the bathroom 330. Meanwhile, detection of the presence or absence of the person 390 according to the present invention is not limited to the embodiment described above. The presence or absence of the person 390 in the bathroom 330 may be determined, for example, based on lighting of the bathroom illumination 360. In other words, it is determined that the person 390 is in the bathroom 330 when the bathroom illumination 360 is turned on.

In this case, upon receiving an illumination lighting detection signal from the illumination lighting detection unit 301, the signal reception unit 410 outputs it to the human detection unit 420. Upon receiving the illumination lighting detection signal via the signal reception unit 410, the human detection unit 420 determines that the person 390 is in the bathroom 330. Then, the human detection unit 420 makes the transmission power generation instruction unit 431 start generating transmission power.

Figure 6:
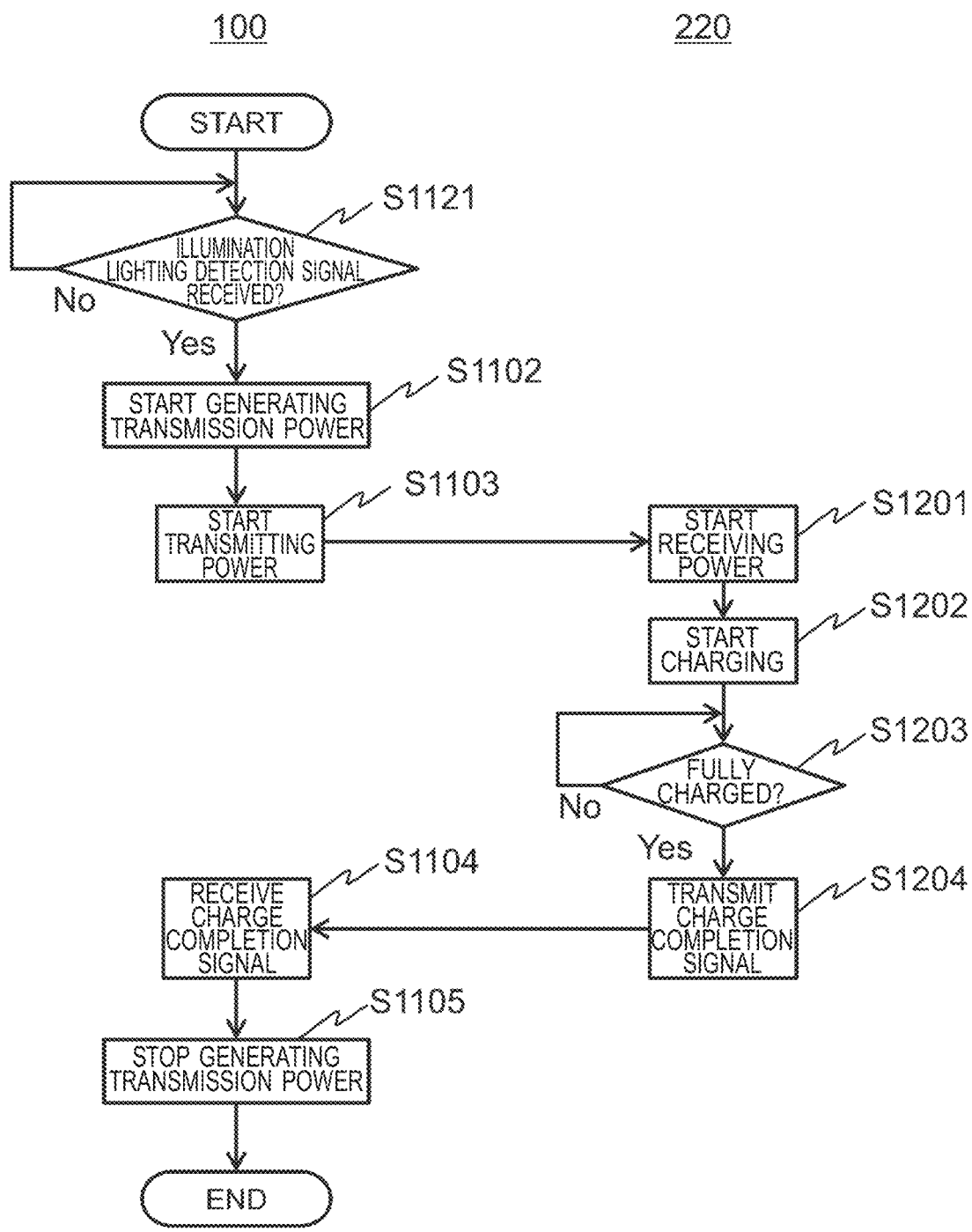
FIG. 6 illustrates a flowchart of transmission power generation processing according to a second modification of a first embodiment.

FIG. 6 illustrates a transmission power generation processing flow according to the present modification. In FIG. 6, the same reference signs are provided with the same processes as those in the embodiment described above, and repetitive explanation thereof will be omitted. In the same manner as the first embodiment, in the present modification, the transmission power generation processing starts when the non-contact power transmission device 100 is activated. In the following, it is configured that the battery level detection signal is transmitted to the non-contact power transmission device 100 when the battery 214 is fully charged.

In the present modification, instead of steps S1101 of the transmission power generation processing according to the embodiment described above, step S1121 is provided. In step S1121, the human detection unit 420 detects whether the person 390 is detected in the bathroom 330 based on whether the illumination lighting detection signal has been received via the signal reception unit 410. The other processes are the same as those of the embodiment described above.

According to the present modification, when the bathroom illumination 360 is turned on, it is determined that the person 390 is in the bathroom 330, and the non-contact power transmission device 100 is operated. In the same manner as the embodiment described above, the non-contact power transmission device 100 is operated in a state where there is a high possibility that the person 390 is near the non-contact power transmission device 100, and accordingly, it is possible to provide the non-contact power transmission/reception system 101 with high safety. Depending on the environment in the bathroom 330, there is a case that the illumination lighting detection unit 301 using an illuminance sensor can perform detection more sensitively than the human sensor unit 302. In such an environment, the present modification is effective.

In the present modification, in the same manner as the first modification, it may be configured to, after the start of power transmission, continue to monitor the illumination lighting detection signal, and when not receiving the illumination lighting detection signal in a predetermined period, determine that the person 390 is absent in the bathroom 330, and perform control to stop transmitting power.

<Third Modification>

Furthermore, the presence or absence of the person 390 in the bathroom 330 may be determined, for example, based on lighting of the bathroom illumination 360 and the presence or absence of an opening/closing operation with respect to the bathroom door 332. In other words, it is determined that the person 390 is in the bathroom 330 when the bathroom illumination 360 is turned on as well as when an opening/closing operation with respect to the bathroom door 332 is made.

In this case, upon receiving the illumination lighting detection signal from the illumination lighting detection unit 301, the signal reception unit 410 outputs it to the human detection unit 420. In addition, upon receiving a door opening/closing detection signal from the door opening/closing lock detection unit 305, the signal reception unit 410 outputs it to the human detection unit 420.

Upon receiving the illumination lighting detection signal and the door opening/closing detection signal via the signal reception unit 410, the human detection unit 420 determines that the person 390 is in the bathroom 330. Then, the human detection unit 420 makes the transmission power generation instruction unit 431 start generating transmission power.

Figure 7:
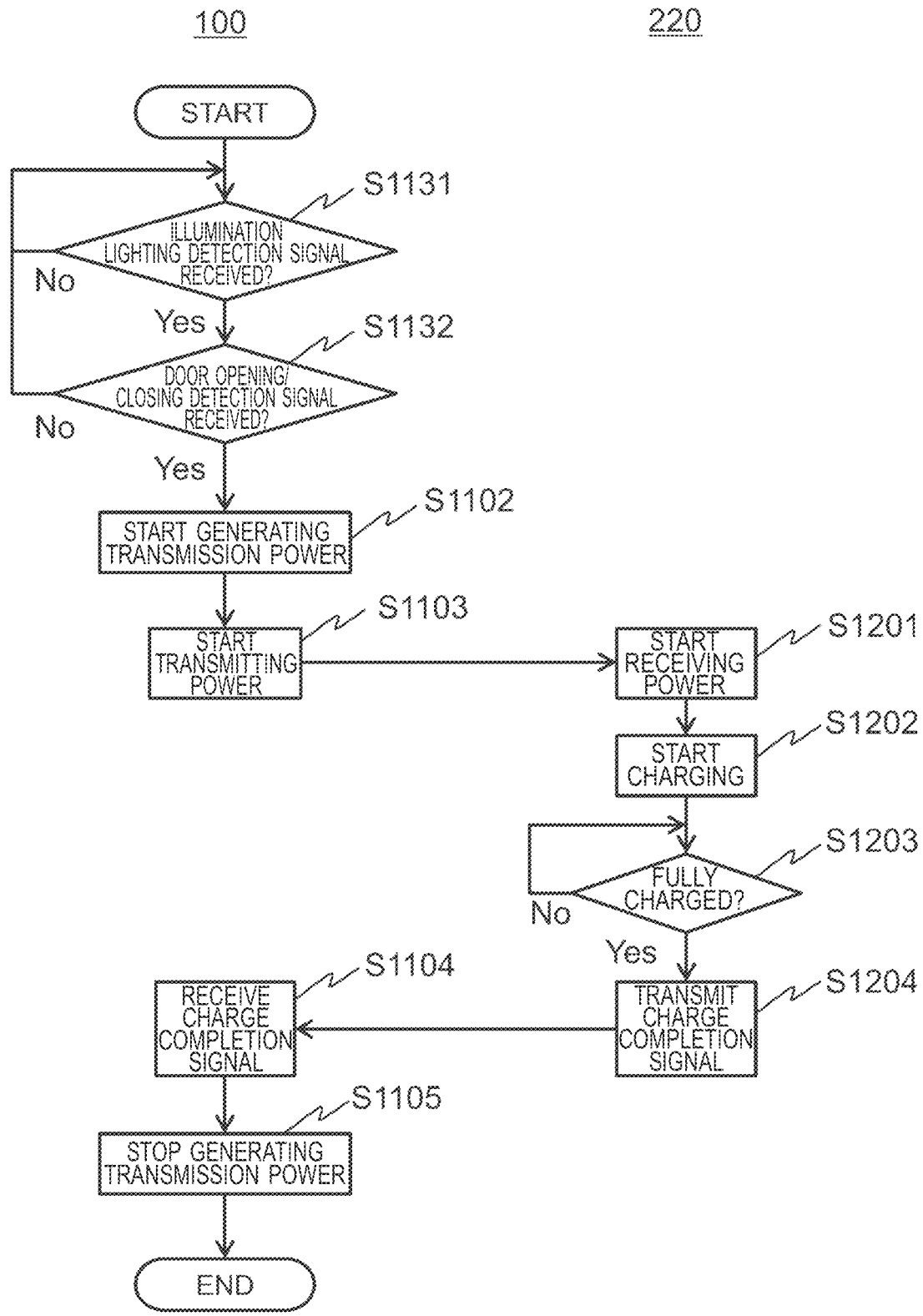
FIG. 7 illustrates a flowchart of transmission power generation processing according to a third modification of a first embodiment.

FIG. 7 illustrates a transmission power generation processing flow according to the present modification. In FIG. 7, the same reference signs are provided with the same processes as those in the embodiment described above, and repetitive explanation thereof will be omitted. In the same manner as that of the first embodiment, in the present modification, the transmission power generation processing starts when the non-contact power transmission device 100 is activated. In the following, it is configured that the battery level detection signal is transmitted to the non-contact power transmission device 100 when the battery 214 is fully charged.

In the present modification, instead of step S1101 of the transmission power generation processing according to the embodiment described above, step S1131 and step S1132 are provided.

First, the human detection unit 420 determines whether the illumination lighting detection signal has been received via the signal reception unit 410 (step S1131). When not receiving the illumination lighting detection signal, the human detection unit 420 continues to monitor the illumination lighting detection signal.

On the other hand, in step S1131, when receiving the illumination lighting detection signal, the human detection unit 420 determines whether the door opening/closing detection signal is received via the signal reception unit 410 (step S1132). When the human detection unit 420 does not receive the door opening/closing detection signal, the processing returns to step S1131 and the human detection unit 420 continues to monitor the detection signal.

On the other hand, in step S1132, when receiving the door opening/closing detection signal, the human detection unit 420 determines that the person 390 is in the bathroom 330, and the processing proceeds to step S1102. The subsequent processes are the same as those of the embodiment described above.

It should be noted that either of the determination as to whether the illumination lighting detection signal has been received and the determination as to whether the door opening/closing detection signal has been received may be performed first.

According to the present modification, when the bathroom illumination 360 is turned on and when an opening/closing operation of the bathroom door 332 is made, it is determined that the person 390 is in the bathroom 330, and thus the non-contact power transmission device 100 is operated. In the same manner as the embodiment described above, the non-contact power transmission device 100 is operated in a state where there is a high possibility that the person 390 is near the non-contact power transmission device 100, and accordingly, it is possible to provide the non-contact power transmission/reception system 101 with high safety.

In the present embodiment, since the opening/closing operation of the bathroom door 332 is also added to the determination, the presence or absence of the person 390 in the bathroom 330 can be determined more accurately.

In the present modification, in the same manner as the first modification, it may be configured to, after the start of power transmission, continue to monitor the illumination lighting detection signal, and when not receiving the illumination lighting detection signal in a predetermined period, determine that the person 390 is absent in the bathroom 330, and perform control to stop transmitting the power.

Furthermore, it may be configured to, after the start of power transmission, continue to monitor the door opening/closing detection signal, and when receiving the door opening/closing detection signal again, determine that the person 390 has left the bathroom 330, and perform control to stop transmitting the power.

<Fourth Modification>

Still further, detection performed by the human sensor unit 302 may also be added to the third modification. That is, upon receiving the illumination lighting detection signal, the door opening/closing detection signal, and the human detection signal in the bathroom 330 via the signal reception unit 410, the human detection unit 420 determines that the person 390 is in the bathroom 330. Then, the human detection unit 420 makes the transmission power generation instruction unit 431 start generating transmission power.

Figure 8:
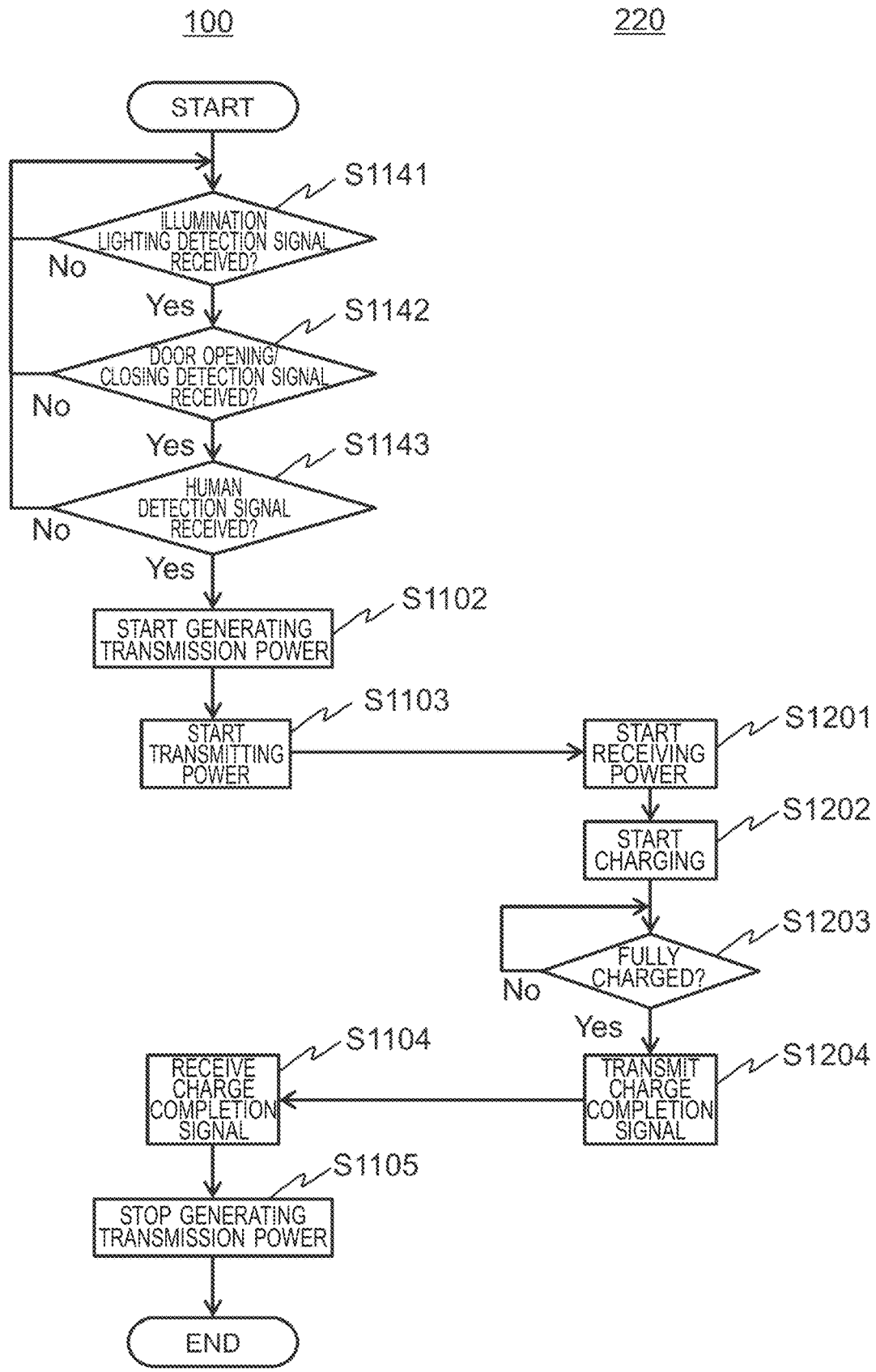
FIG. 8 illustrates a flowchart of transmission power generation processing according to a fourth modification of a first embodiment.

FIG. 8 illustrates a transmission power generation processing flow according to the present modification. In FIG. 8, the same reference signs are provided with the same processes as those in the embodiment described above, and repetitive explanation thereof will be omitted. In the same manner as that of the first embodiment, in the present modification, the transmission power generation processing starts when the non-contact power transmission device 100 is activated. In the following, it is configured that the battery level detection signal is transmitted to the non-contact power transmission device 100 when the battery 214 is fully charged.

In the present modification, instead of step S1101 of the transmission power generation processing according to the embodiment described above, step S1141, step S1142 and step S1143 are provided.

First, the human detection unit 420 determines whether the illumination lighting detection signal has been received via the signal reception unit 410 (step S1141). When not receiving the illumination lighting detection signal, the human detection unit 420 continues to monitor the illumination lighting detection signal.

On the other hand, in step S1141, when receiving the illumination lighting detection signal, the human detection unit 420 determines whether the door opening/closing detection signal has been received via the signal reception unit 410 (step S1142). When not receiving the door opening/closing detection signal, the processing returns to step S1141 and the human detection unit 420 continues to monitor the detection signal.

On the other hand, in step S1142, when receiving the door opening/closing detection signal, the human detection unit 420 determines whether the human detection signal has been received via the signal reception unit 410 (step S1143). When not receiving the door opening/closing detection signal, the processing returns to step S1141 and the human detection unit 420 continues to monitor the detection signal.

On the other hand, in step S1143, when receiving the human detection signal, the human detection unit 420 determines that the person 390 is in the bathroom 330, and the processing proceeds to step S1102. The subsequent processes are the same as those of the embodiment described above.

It should be noted that the processing order of the determination as to whether the illumination lighting detection signal has been received, the determination as to whether the door opening/closing detection signal has been received, and the determination as to whether the human detection signal has been received does not matter herein.

According to the present modification, when the bathroom illumination 360 is turned on, when the opening/closing operation of the bathroom door 332 is made, and when the human detection signal is received, it is determined that the person 390 is in the bathroom 330, and thus the non-contact power transmission device 100 is operated. That is, whether the person 390 is in the bathroom 330 is determined based on the outputs from the three different sensors. With this configuration, the presence or absence of the person 390 can be detected with high accuracy regardless of the environment in the bathroom 330.

As a result, in the same manner as the embodiment described above, the non-contact power transmission device 100 is operated in a state where there is a high possibility that the person 390 is near the non-contact power transmission device 100, and accordingly, it is possible to provide the non-contact power transmission/reception system 101 with high safety.

In the present modification, whether the door opening/closing detection signal is received may not be used in the determination. In other words, the human detection unit 420 may be configured to determine that the person 390 is in the bathroom 330 when receiving the illumination lighting detection signal and the human detection signal.

In the present modification, in the same manner as each of the modifications, it may be configured to, after the start of power transmission, continue to monitor the illumination lighting detection signal, and when not receiving the illumination lighting detection signal in a predetermined period, determine that the person 390 is absent in the bathroom 330, and perform control to stop transmitting the power.

Furthermore, it may be configured to, after the start of power transmission, continue to monitor the door opening/closing detection signal, and when receiving the door opening/closing detection signal again, determine that the person 390 is absent in the bathroom 330, and perform control to stop transmitting the power.

<Fifth Modification>

Furthermore, the presence or absence of the person 390 in the bathroom 330 may be determined based on a lock detection signal and an unlock detection signal output from the door opening/closing lock detection unit 305.

Normally, the bathroom 330 is locked when the person 390 enters the bathroom. After the bathroom 330 is locked, the bathroom 330 is unlocked when the person 390 leaves the bathroom 330. Accordingly, the present modification utilizes the above and determines the presence or absence of the person 390 in the bathroom 330.

In this case, upon receiving the lock detection signal from the door opening/closing lock detection unit 305, the signal reception unit 410 outputs it to the human detection unit 420. Upon receiving the unlock detection signal, the signal reception unit 410 outputs it to the transmission power generation stop instruction unit 432.

Upon receiving the lock detection signal via the signal reception unit 410, the human detection unit 420 determines that the person 390 is in the bathroom 330. Then, the human detection unit 420 provides the transmission power generation instruction unit 431 with an instruction to start generating transmission power.

During the generation of transmission power, when receiving the unlock detection signal via the signal reception unit 410, the transmission power generation stop instruction unit 432 makes the transmission power generation unit 120 stop generating the transmission power.

Figure 9:
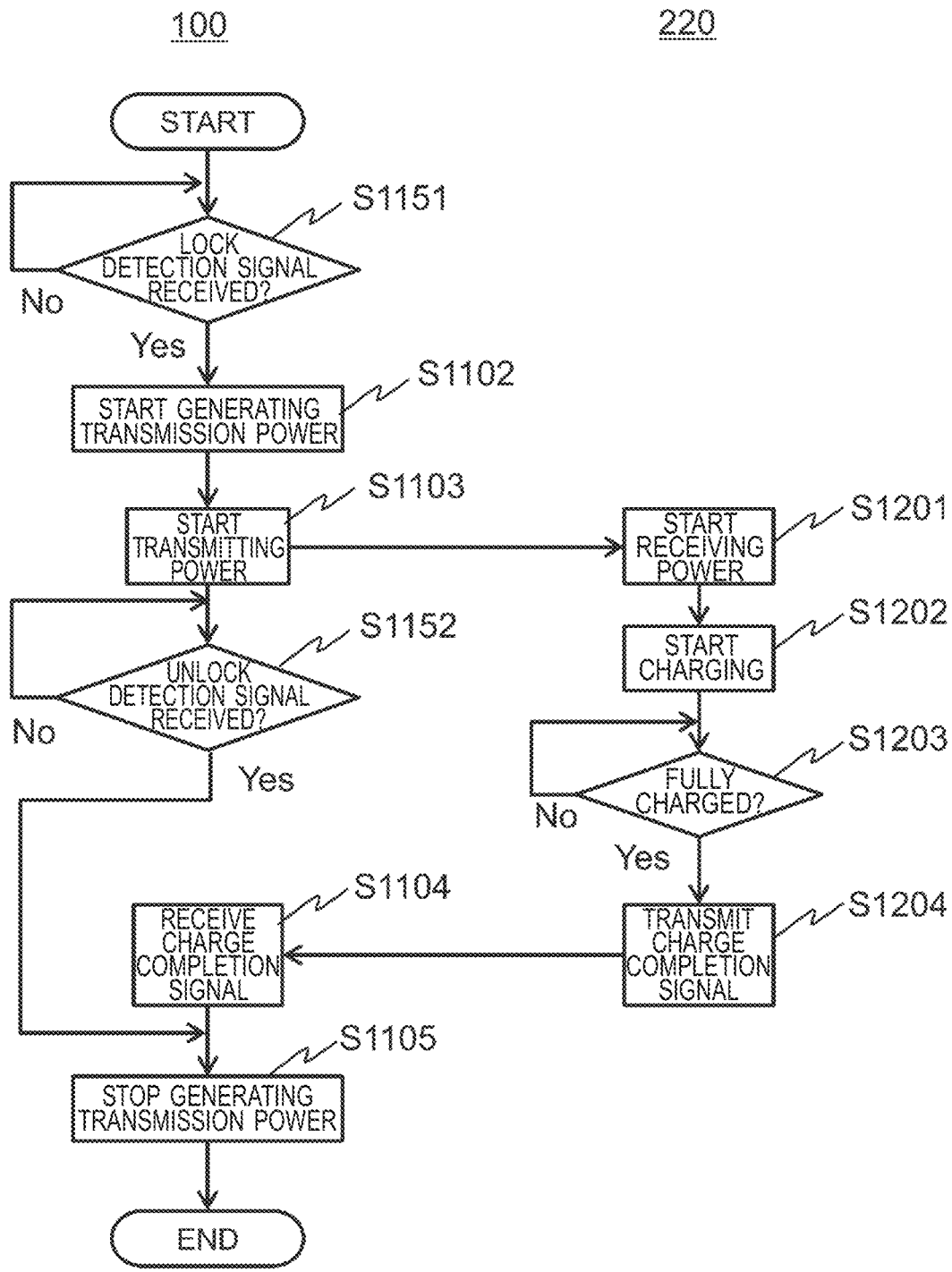
FIG. 9 illustrates a flowchart of transmission power generation processing according to a fifth modification of a first embodiment.

FIG. 9 illustrates a transmission power generation processing flow according to the present modification. In FIG. 9, the same reference signs are provided with the same processes as those in the embodiment described above, and repetitive explanation thereof will be omitted. In the same manner as that of the first embodiment, in the present modification, the transmission power generation processing starts when the non-contact power transmission device 100 is activated. In the following, it is configured that the battery level detection signal is transmitted to the non-contact power transmission device 100 when the battery 214 is fully charged.

In the present modification, instead of step S1101 of the transmission power generation according to the embodiment described above, step S1151 is provided.

That is, the human detection unit 420 determines whether the lock detection signal has been received via the signal reception unit 410 (step S1151). When not receiving the lock detection signal, the human detection unit 420 continues to monitor the lock detection signal.

On the other hand, when receiving the lock detection signal in step S1151, the human detection unit 420 determines that the person 390 is in the bathroom 330, and the processing proceeds to step S1102.

In the present modification, after the start of power transmission, the transmission power generation stop instruction unit 432 monitors the unlock detection signal (step S1152). Then, when receiving the unlock detection signal, the processing proceeds to step S1105, and the transmission power generation stop instruction unit 432 makes the transmission power generation unit 120 stop generating the transmission power.

Also in the present modification, it may be configured to, once starting the generation of transmission power and even when the person 390 leaves the bathroom 330, continue to transmit power until the charging is completed. In such a case, the process in step S1152 may not be performed.

Second Embodiment

Next, a second embodiment of the present invention will be described. In the present embodiment, regardless of presence or absence of the person 390 in the bathroom 330, the non-contact power transmission device 100 performs charging to the bubble generator 220. However, depending on the presence or absence of the person 390 in the bathroom 330, the power during charging is changed. In other words, when it is determined that the person 390 is in the bathroom 330, power transmission is performed at a power level lower than a case where it is determined that the person 390 is absent.

As described above, in the present embodiment, the non-contact power transmission device 100 is configured to change a level of power to be generated depending on a case where it is disposed in an environment in which the person 390 is present therearound or a case where it is disposed in an environment in which the person 390 is absent, thereby improving safety.

The configuration of the non-contact power transmission/reception system 101 according to the present embodiment is basically the same as that of the first embodiment. Hereinafter, some of the configuration which are different from those of the first embodiment will be focused and described. In the present embodiment as well, a case where the bubble generator 220 disposed in the bathtub 350 of the bathroom 330 is used as the non-contact power reception device 200 will be described as an example.

In the present embodiment, it is assumed that the transmission power generation unit 120 is the one which can generate transmission power in two levels. The transmission power with the higher power level is called high transmission power while the transmission power of with the lower power level is called low transmission power.

The DC voltage output from the DC-DC converter unit 112 to the amplification unit 114 is changed in accordance with an instruction from the control unit 117, which produces the transmission power at each power level.

That is, in the present embodiment, upon receiving an instruction to generate the high transmission power from the control unit 117, the transmission power generation unit 120 makes the DC-DC converter unit 112 output a DC voltage, which is higher than a voltage generated when receiving an instruction to generate the low transmission power, to the amplification unit 114. The DC voltages output corresponding to each power level are predetermined, and stored such as in the memory unit 118.

[Functional Block]

Figure 10:
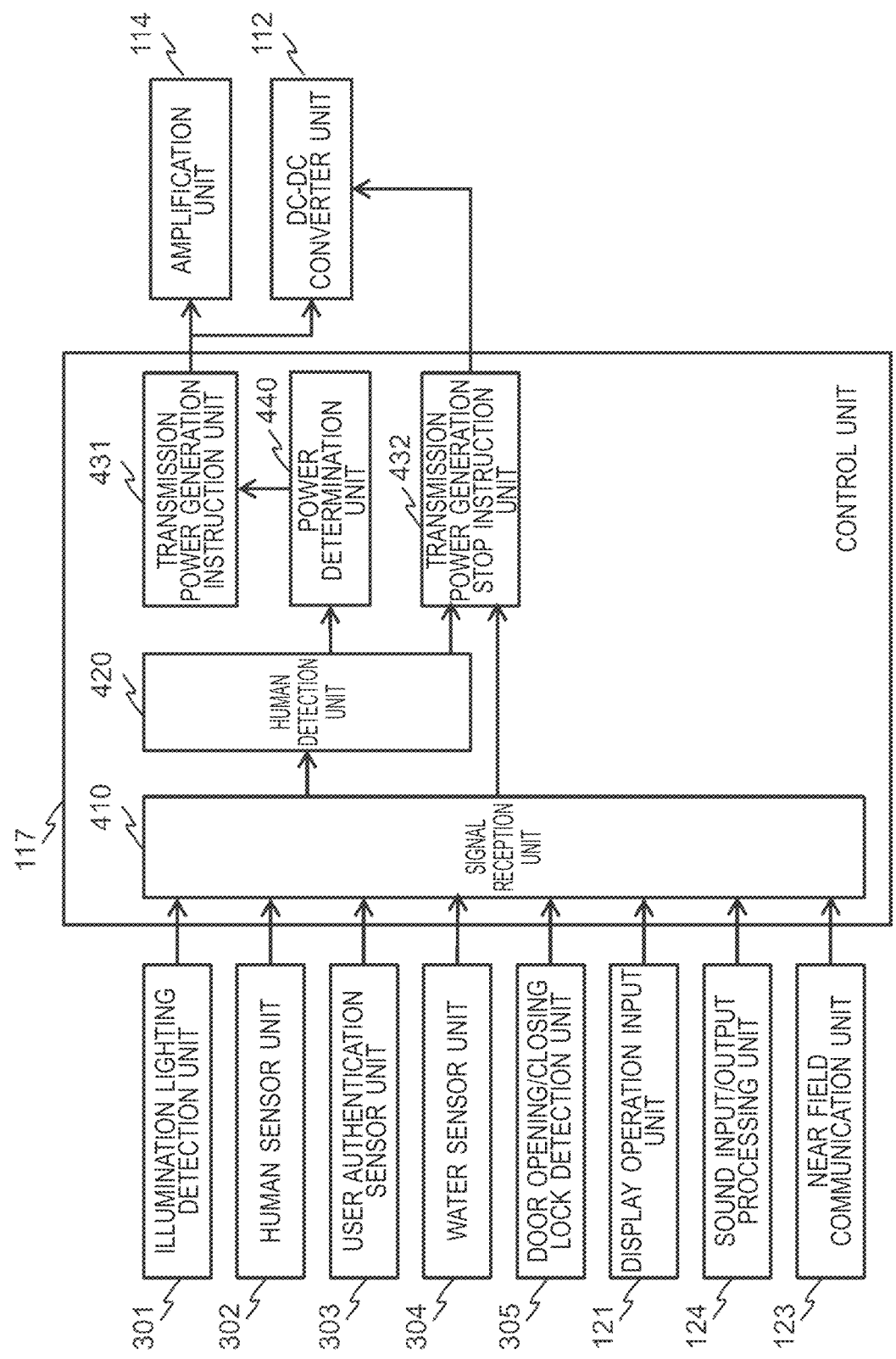
FIG. 10 is a function block diagram of a control unit of a non-contact power transmission device according to a second embodiment.

FIG. 10 is a functional block diagram of the control unit 117 of the non-contact power transmission device 100 according to the present embodiment. As illustrated in FIG. 10, the control unit 117 according to the present embodiment includes a power determination unit 440 in addition to the configuration according to the first embodiment.

The transmission power generation instruction unit 431 according to the present embodiment provides the transmission power generation unit 120 with an instruction to generate transmission power at the power level determined by the power determination unit 440. At the time when the non-contact power transmission device 100 is activated, the transmission power generation instruction unit 431 makes the transmission power generation unit 120 start generating transmission power at a predetermined power level. Hereinafter, in the present embodiment, a case where the initial power is determined to be high power will be described as an example.

After generation of transmission power is started, the power determination unit 440 determines power in accordance with a detection result by the human detection unit 420 and outputs it to the transmission power generation instruction unit 431.

In the present embodiment, when the human detection unit 420 detects that the person 390 is in the bathroom 330, the power determination unit 440 determines that the power should be low. On the other hand, when the person 390 is not detected, the power determination unit 440 determines that the power should be high.

The detection of the person 390 by the human detection unit 420 may be performed by any of the methods described in the first embodiment and its modifications.

[Transmission Power Generation Processing]

Figure 11:
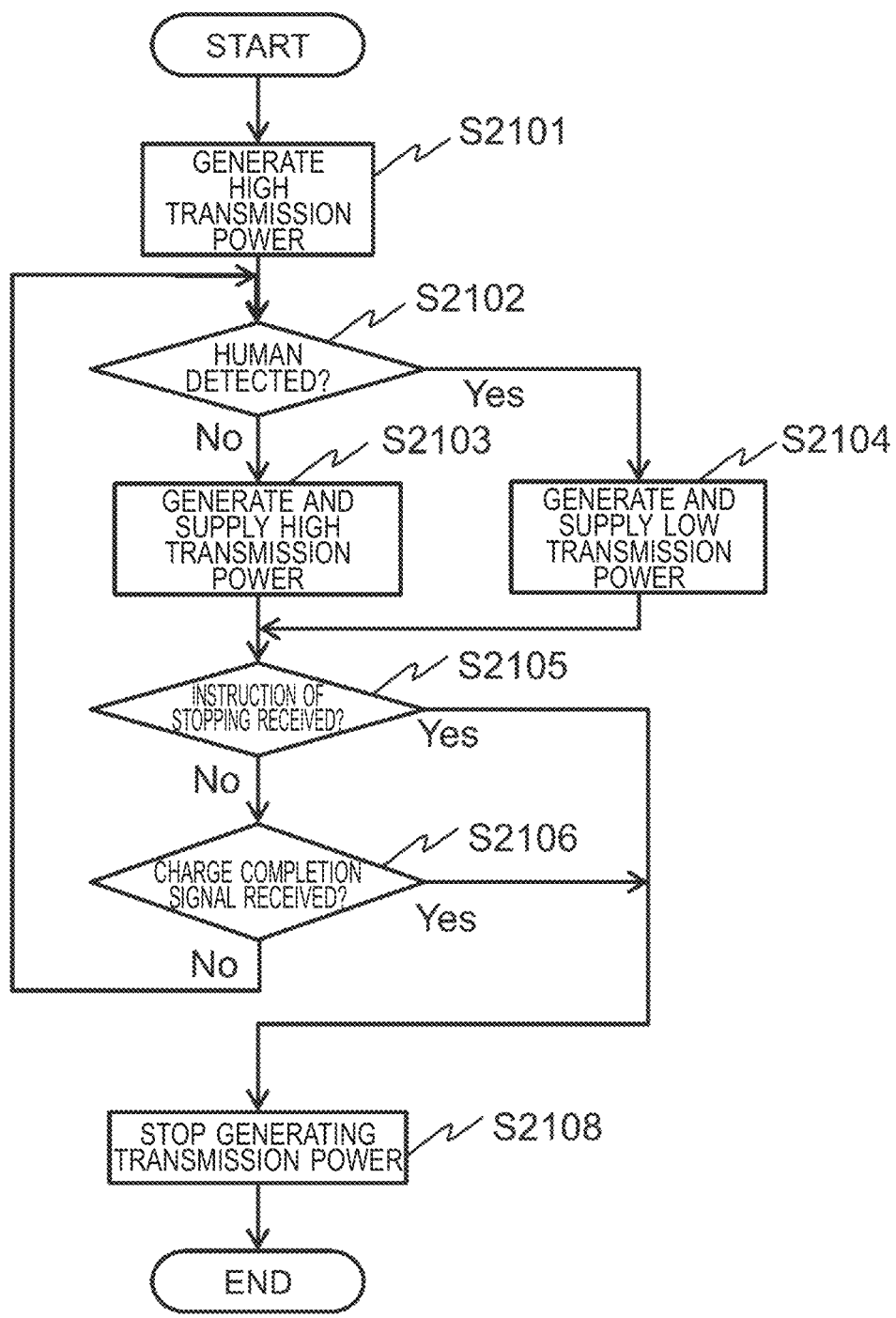
FIG. 11 illustrates a flowchart of transmission power generation processing according to a second embodiment.

Hereinafter, a transmission power generation processing flow performed by the control unit 117 according to the present embodiment will be described. FIG. 11 illustrates a processing flow of the transmission power generation processing according to the present embodiment. The transmission power generation processing starts when the non-contact power transmission device 100 is activated. It is configured such that a battery level detection signal is not transmitted every time a battery level is detected, but is transmitted to the non-contact power transmission device 100 when the battery 214 is fully charged.

Upon detecting that the non-contact power transmission device 100 is activated, first, the transmission power generation instruction unit 431 makes the transmission power generation unit 120 generate high transmission power (step S2101).

After generation of the power transmission is started, the human detection unit 420 determines whether the person 390 is detected in the bathroom 330 (step S2102). Then, the human detection unit 420 outputs a determination result to the power determination unit 440.

When the person 390 is not detected, the power determination unit 440 determines the transmission power to be generated should be high transmission power, and provides the transmission power generation instruction unit 431 with an instruction. In response thereto, the transmission power generation instruction unit 431 makes the transmission power generation unit 120 generate high transmission power (step S2103).

On the other hand, when the person 390 is detected, the power determination unit 440 determines the transmission power to be generated should be low transmission power, and provides the transmission power generation instruction unit 431 with an instruction. In response thereto, the transmission power generation instruction unit 431 makes the transmission power generation unit 120 generate low transmission power (step S2104).

The transmission power generation stop instruction unit 432 determines whether an instruction to stop the non-contact power transmission device 100, or an instruction to stop generating the transmission power has been received (step S2105). When receiving either of the instructions, the transmission power generation stop instruction unit 432 makes the transmission power generation unit 120 stop generating the transmission power (step S2108), and the processing is ended.

In this connection, an instruction to stop the non-contact power transmission device 100 and an instruction to stop generating the transmission power are accepted, for example, by the display operation input unit 121. The transmission power generation stop instruction unit 432 receives these instructions via the signal reception unit 410.

In step S2105, when not receiving the instruction of stopping, the transmission power generation stop instruction unit 432 determines whether a charge completion signal has been received from the bubble generator 220 (step S2106). When the transmission power generation stop instruction unit 432 receives the charge completion signal, the processing proceeds to step S2108.

On the other hand, when the transmission power generation stop instruction unit 432 does not receive the charge completion signal, the power determination unit 440 returns to the process in step S2102 while the processing is continued.

As described above, according to the present embodiment, in the non-contact power transmission device 100, transmission power is usually generated at high power, and supplied to the non-contact power reception device 200. In this case, in the non-contact power reception device 200, the battery 214 is charged at high speed.

On the other hand, when the person 390 is near the non-contact power transmission device 100, the transmission power is generated and supplied at low power. With this configuration, it is possible to reduce exposure of high power to the human body, thereby improving the safety of the human body when using the non-contact power transmission/reception system 101 in the bathroom 330.

In this way, according to the present embodiment, it is possible to realize the non-contact power transmission/reception system 101 having both efficiency and safety.

In this connection, the control unit 117 may be configured to, while generation of transmission power is performed at high power, perform output so as to indicate that the transmission power is generated and supplied at high power. The output is provided, for example, by display to at least one of the display operation input unit 121 of the non-contact power transmission device 100 and the display operation input unit 221 of the non-contact power reception device 200, and/or by sound output from at least one of the sound input/output processing unit 124 of the non-contact power transmission device 100 and the sound input/output processing unit 224 of the non-contact power reception device 200.

In the same manner as above, the control unit 117 may be configured to, while generation of transmission power is performed at low power, perform output so as to indicate that the transmission power is generated and supplied at low power.

In addition, in the embodiment described above, control may be performed so as to generate transmission power at low power at the time of activation, and thereafter generate transmission power at high power when the person 390 is not detected.

Third Embodiment

Next, a third embodiment according to the present invention will be described. In the same manner as the second embodiment, in the present embodiment, regardless of the presence or absence of the person 390 in the bathroom 330, transmission of power is performed. In the present embodiment, a level of transmission power is changed in accordance with the surrounding environment of the bubble generator 220 which serves as the non-contact power reception device 200. In the present embodiment, the presence or absence of a person does not matter.

The bubble generator 220 generates heat internally as being transferred with power wirelessly, which may reduce operation efficiency or make its reception power limited. In view of this problem, in the present embodiment, depending on the cooling capacity (cooling environment) of the environment, in which the bubble generator 220 is arranged, with respect to the bubble generator 220, the level of transmission power to be generated by the non-contact power transmission device 100 is changed.

Specifically, when the bubble generator 220 is not immersed in water of the bathtub 350, transmission power is generated at the lowest level (first power) and supplied to the bubble generator 220. When the bubble generator 220 is immersed in the water of the bathtub 350, the level of power to be generated and supplied is changed in accordance with the water temperature. For example, when the water temperature is less than a predetermined water temperature threshold, transmission power is generated and supplied at the highest level (third power). Meanwhile, when the water temperature is equal to or greater than the water temperature threshold, transmission power is generated at the level (second power) which is between the first power and the third power, and supplied to the bubble generator 220.

In the present embodiment, it is assumed that the level of the first power is lower than that of the second power as described above, however, the levels of both power are not limited thereto. Depending on the air temperature and the water temperature, the level of the second power may be set lower than that of the first power.

Hereinafter, the present embodiment will be described focusing on some of the configuration which are different from those of the first embodiment.

[Functional Block]

Figure 12:
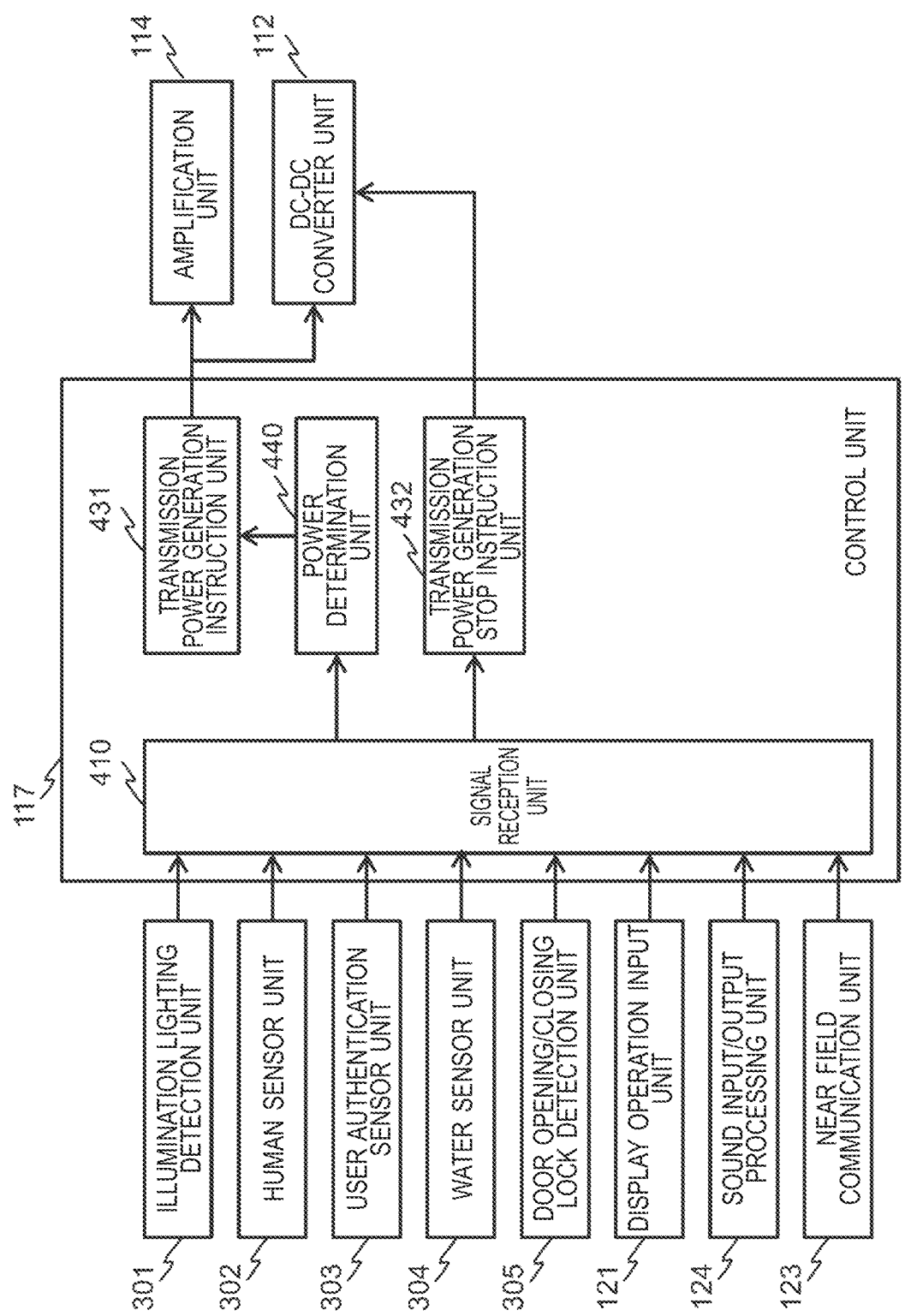
FIG. 12 is a function block diagram of a control unit of a non-contact power transmission device according to a third embodiment.

FIG. 12 is a functional block diagram of the control unit 117 according to the present embodiment. As illustrated in this FIG. 12, the control unit 117 according to the present embodiment includes the signal reception unit 410, the transmission power generation instruction unit 431, the transmission power generation stop instruction unit 432, and the power determination unit 440.

When the non-contact power transmission device 100 according to the present embodiment is activated, the transmission power generation instruction unit 431 provides the transmission power generation unit 120 with an instruction to generate transmission power at the power level determined by the power determination unit 440.

The power determination unit 440 determines the level of power according to an arrangement state of the bubble generator 220 which serves as the non-contact power reception device 200, and outputs it to the transmission power generation instruction unit 431.

In the present embodiment, when the bubble generator 220 is not immersed in the water, the level of the transmission power is determined to be the lowest, that is, the first power. On the other hand, when the bubble generator 220 is immersed in the water and the water temperature is less than the water temperature threshold, the level of the transmission power is determined to be the highest, that is, the third power. When the bubble generator 220 is immersed in the water while the water temperature is equal to or greater than the water temperature threshold, the transmission power is determined to the second power of which the level is between the first power and the third power.

The power determination unit 440 determines whether the bubble generator 220 is immersed in the water based on whether a water immersion detection signal has been received from the water sensor unit 304. The power determination unit 440 receives the water immersion detection signal via the signal reception unit 410.

When the water sensor detects a water level and outputs the water level as a water level signal, the power determination unit 440 compares an arrangement position of the bubble generator 220 with the water level to determine whether the bubble generator 220 is immersed in the water. The arrangement position of the bubble generator 220 is acquired by, for example, size data of the bubble generator 220. The size data of the bubble generator 220 is stored in advance in the memory unit 118, etc.

The water temperature is determined by using a water temperature detection signal from the water sensor unit 304. The power determination unit 440 receives the water temperature detection signal also via the signal reception unit 410.

[Transmission Power Generation Processing]

Figure 13:
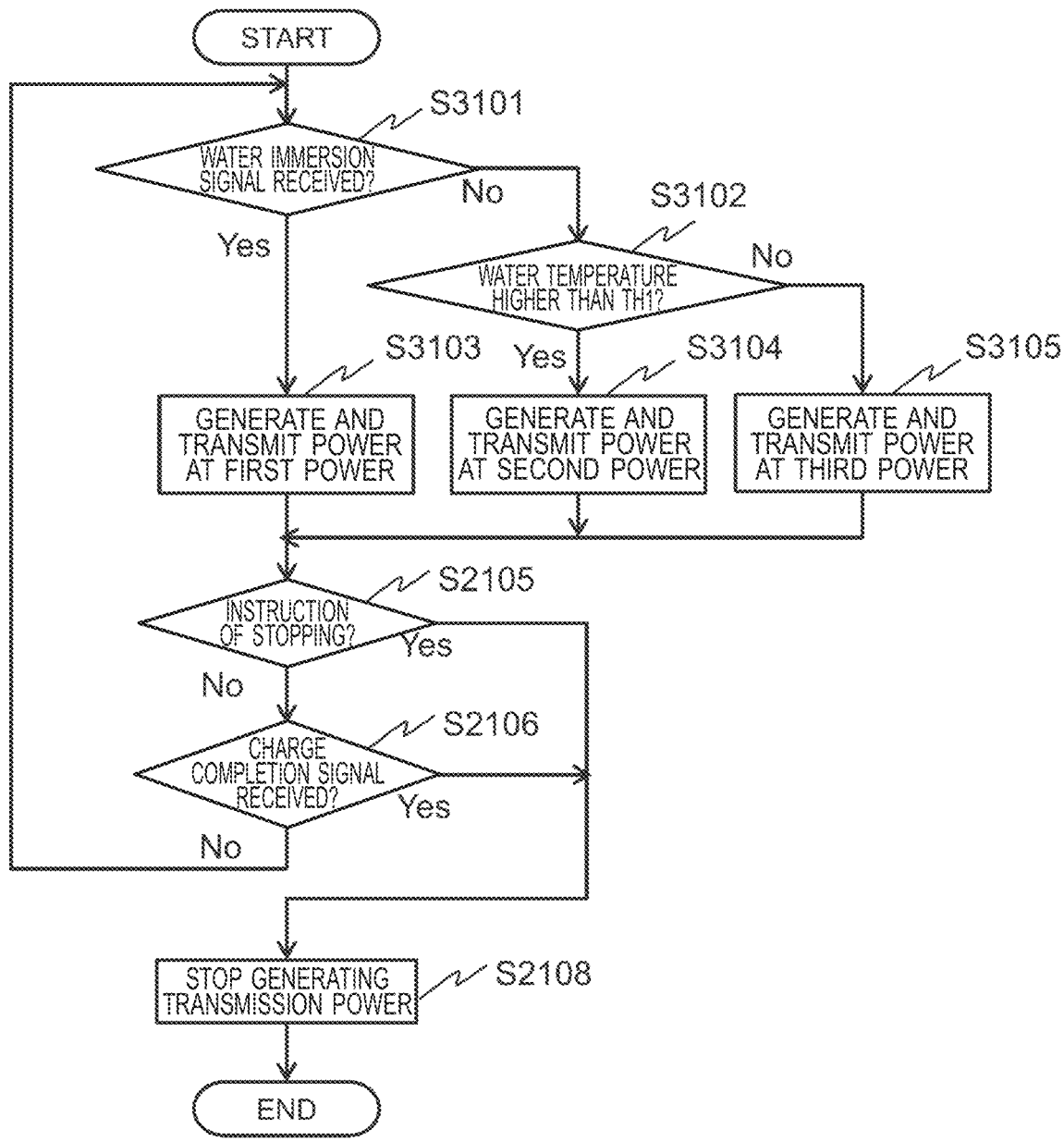
FIG. 13 illustrates a flowchart of transmission power generation processing according to a third embodiment.

Hereinafter, a transmission power generation processing flow performed by the control unit 117 according to the present embodiment will be described. FIG. 13 is a processing flow of the transmission power generation processing according to the present embodiment. The transmission power generation processing starts when the non-contact power transmission device 100 is activated. It is configured such that a battery level detection signal is transmitted to the non-contact power transmission device 100 when the battery 214 is fully charged.

The power determination unit 440 determines whether a water immersion signal has been received (step S3101). When receiving the water immersion signal, the power determination unit 440 determines the level of the transmission power to be the first power, and notifies it to the transmission power generation instruction unit 431.

Upon receiving the notification, the transmission power generation instruction unit 431 makes the transmission power generation unit 120 generate the transmission power at the first power (step S3103).

On the other hand, when not receiving the water immersion signal, the power determination unit 440 determines whether the water temperature is equal to or greater than a water temperature threshold TH1 (step S3102). When the water temperature is equal to or greater than the water temperature threshold TH1, the power determination unit 440 determines the level of the transmission power to be the second power, and notifies it to the transmission power generation instruction unit 431.

Upon receiving the notification, the transmission power generation instruction unit 431 makes the transmission power generation unit 120 generate the transmission power at the second power (step S3103).

On the other hand, when the water temperature is less than the water temperature threshold TH1, the power determination unit 440 determines the level of the transmission power to be the third power, and notifies it to the transmission power generation instruction unit 431.

Upon receiving the notification, the transmission power generation instruction unit 431 makes the transmission power generation unit 120 generate the transmission power at the third power (step S3103).

The processes after determining the level of the transmission power are the same as those after the step S2105 of the second embodiment. That is, the control unit 117 according to the present embodiment continues the processing above until an instruction of stopping is received or charging is completed.

As described above, according to the present embodiment, when the bubble generator 220 is disposed in an environment where the temperature of water in the bathtub 350 is low and the cooling property is high, high power is transmitted to the bubble generator 220 to charge the battery 214 thereof. On the other hand, when the water temperature is higher than a predetermined temperature, the power lower than the high power is transmitted to the bubble generator 220. In addition, when the bubble generator 220 is not immersed in the water, the power is transmitted to the bubble generator 220 at the level which is different from that of the power to be transmitted when the bubble generator 220 is immersed in the water.

With this configuration, according to the present embodiment, it is possible to enhance heat dissipation in accordance with the water temperature in the bathtub 350 in which the bubble generator 220 is immersed so as to suppress heat generation in the bubble generator 220, while charging the battery 214 of the bubble generator 220 at higher speed with high cooling efficiency.

In the embodiment described above, only one water temperature threshold is set, meanwhile, the number of water temperature threshold is not restricted to one. When a plurality of water temperature thresholds is set and it is configured that, as the water temperature is low, the power is transmitted at the lower level depending on each of the thresholds, it is possible to control the transmission power more finely and stepwise so as to further optimize a charging operation in accordance with the cooling capability.

The present embodiment may be combined with the first embodiment and its modifications.

Fourth Embodiment

Next, a fourth embodiment of the present invention will be described. In the present embodiment, power is transmitted only to the non-contact power reception device 200 registered in advance as a power transmission target. In other words, in the present embodiment, the non-contact power transmission device 100 generates transmitted power when a preliminary registered non-contact power reception device 200 is disposed around the non-contact power transmission device 100.

Hereinafter, the present embodiment will be described focusing on some of the configuration which are different from those of the first embodiment.

[Functional Block]

Figure 14:
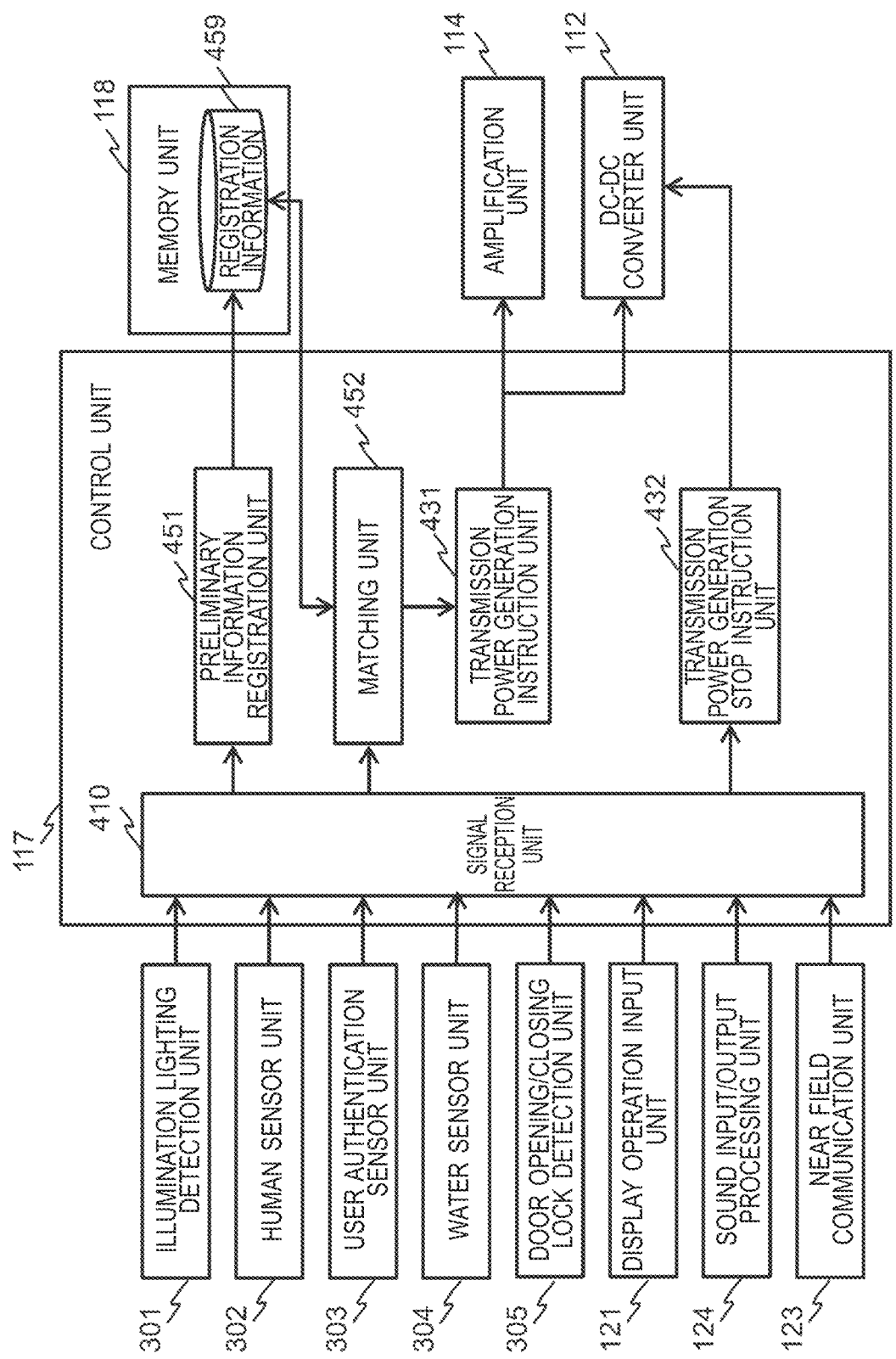
FIG. 14 is a function block diagram of a control unit of a non-contact power transmission device according to a fourth embodiment.

In the present embodiment, the non-contact power reception device 200 which is a supply target (power transfer target) of the transmission power is registered in advance. FIG. 14 is a functional block diagram of the control unit 117 according to the present embodiment, which is for realizing the above.

As illustrated in FIG. 14, the control unit 117 according to the present embodiment includes a preliminary information registration unit 451, a matching unit 452, a transmission power generation instruction unit 431, and a transmission power generation stop instruction unit 432.

The preliminary information registration unit 451 registers the non-contact power reception device 200 in advance so as to permit it to be supplied with power. In the present embodiment, for example, the preliminary information registration unit 451 acquires identification information (power reception device recognition information) of the non-contact power reception device 200 to be permitted and stores it in the memory unit 118 as registration information 459.

The power reception device recognition information is acquired, for example, by accepting an input from the user via the display operation input unit 121. It may be acquired via the near field communication unit 123.

The matching unit 452 performs authentication prior to generation of transmission power. In the present embodiment, the matching unit 452 generates a recognition information request and transmits it to the non-contact power reception device 200. Then, the matching unit 452 matches the returned power reception device recognition information with the power reception device recognition information registered as the registration information 459 so as to perform authentication. When they match each other, the authentication is considered successful, and when they do not match each other, the authentication is considered unsuccessful. Then, the matching unit 452 transmits an authentication result to the transmission power generation instruction unit 431.

The matching unit 452 transmits and receives the authentication information request and the authentication information via the near field communication unit 123 and the near field communication unit 223.

The power reception device recognition information to be acquired as the registration information 459 is also held at the non-contact power reception device 200 side. When receiving the recognition information request from the non-contact power transmission device 100, the non-contact power reception device 200 returns the power reception device recognition information to the non-contact power transmission device 100 which is a request source.

Figure 15:
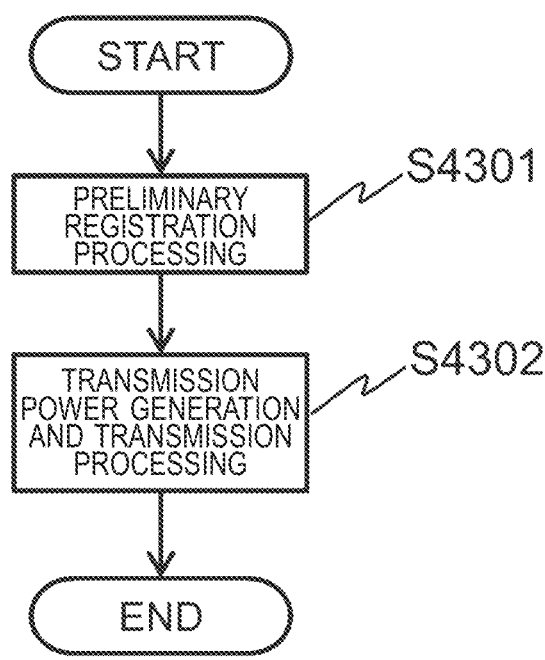
FIG. 15 illustrates a flowchart of processing performed by a control unit of a non-contact power transmission device according to a fourth embodiment.

FIG. 15 illustrates an overall processing flow performed by the control unit 117 according to the present embodiment.

As illustrated in FIG. 15, in the present embodiment, first, the preliminary information registration unit 451 performs preliminary registration processing (step S4301). After the preliminary registration processing is performed, the control unit 117 performs transmission power generation and transmission processing (step S4302). The preliminary registration processing is performed separately from the transmission power generation and transmission processing.

[Transmission Power Generation Processing]

Figure 16:
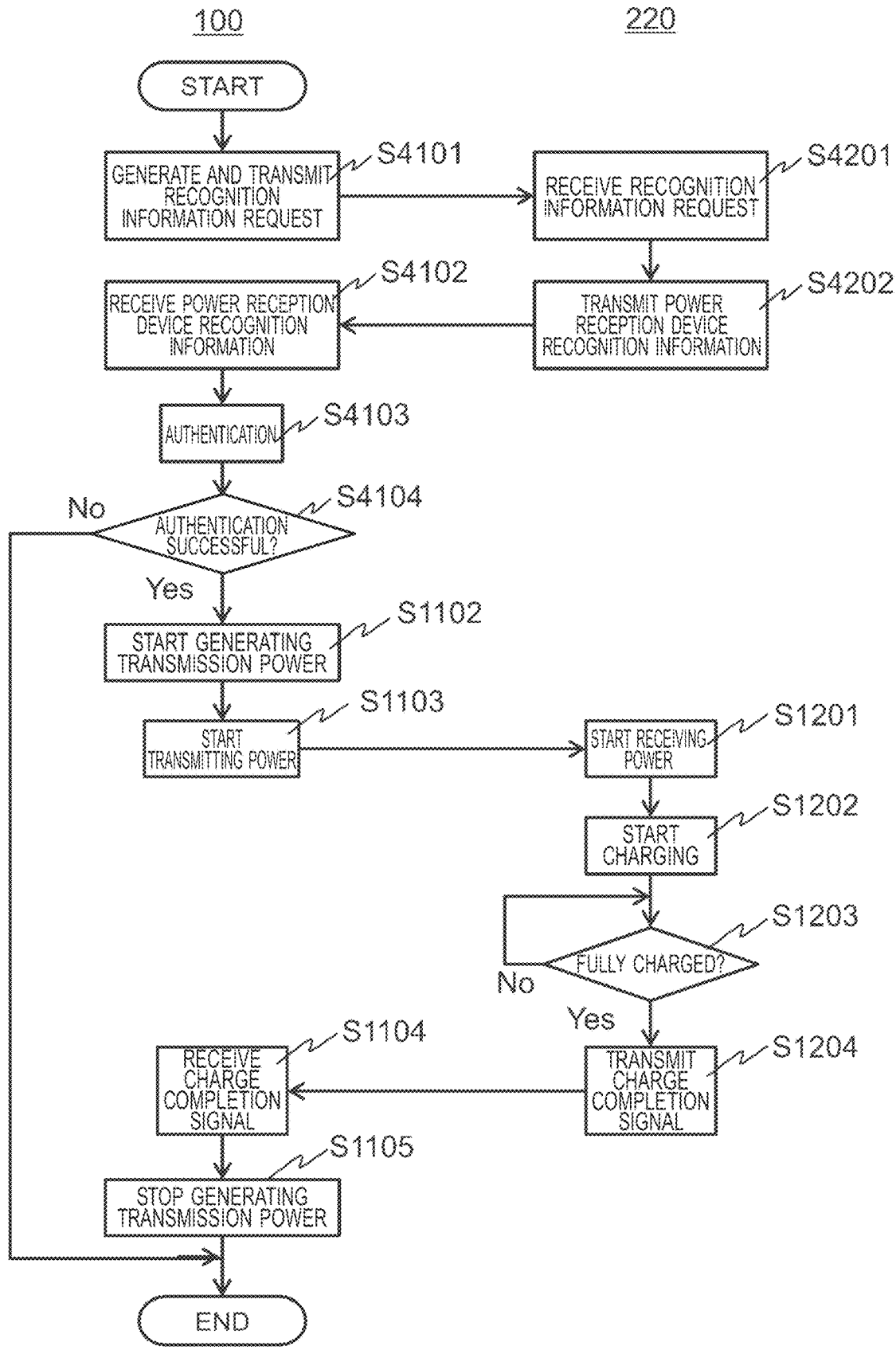
FIG. 16 illustrates a flowchart of transmission power generation processing according to a fourth embodiment.

Hereinafter, a transmission power generation processing flow performed by the control unit 117 according to the present embodiment, of which the preliminary registration processing has been completed, will be described with reference to FIG. 16.

First, the matching unit 452 generates an authentication information request and transmits it to the bubble generator 220 (step S4101).

The bubble generator 220 that has received the authentication information request (step S4201) returns the power reception device recognition information held by itself to the non-contact power transmission device 100, which is a request source, as the authentication information (step S4202).

When receiving the returned power reception device recognition information as the authentication information corresponding to the authentication information request via the signal reception unit 410 (step S4102), the matching unit 452 performs authentication (step S4103). When the authentication fails, the processing is ended as it is.

At this time, an error message may be generated and displayed on the display operation input unit 121, or may be output from the sound input/output processing unit 124.

On the other hand, when the authentication is successful, the matching unit 452 notifies the success of authentication to the transmission power generation instruction unit 431. Then, upon receiving the notification, the transmission power generation instruction unit 431 makes the transmission power generation unit 120 start generating transmission power (step S1102). Subsequent processes are the same as those of the first embodiment.

As described above, according to the present embodiment, transmission power is supplied only to the non-contact power reception device 200 registered in advance. With this configuration, it is possible to prevent the non-contact power transmission device 100 from transmitting power to a non-contact power reception device that is not a target. In other words, it is possible to perform non-contact power transfer only with respect to the non-contact power reception device 200 which corresponds to the non-contact power transmission device 100. As a result, it is possible to improve safety with ease of use.

In this connection, while the matching and authentication work normally between the non-contact power transmission and reception devices and when power which is higher than the power grasped in advance is transmitted to the non-contact power reception device 200, there is a possibility that a metallic foreign substance is present within a wireless power transfer area and the power is also transmitted thereto. Accordingly, the present embodiment may be configured to monitor that transmission of power at the non-contact power transmission device 100 side, and in such a case, stop wireless power transfer in order to avoid a risk of abnormal heat generated in the metallic foreign substance due to the wireless power transfer.

The present embodiment may be combined with the first embodiment, its modifications, the second embodiment, and the third embodiment.

Fifth Embodiment

A fifth embodiment of the present invention will be explained. In the present embodiment, authentication is performed not with respect to the non-contact power reception device 200 to be transmitted, but with respect to the person 390 (user) which is present near the non-contact power transmission device 100. The non-contact power transmission device 100 according to the present embodiment generates transmission power when the person 390 therearound is a preliminary registered person. In other words, in the present embodiment, when a preliminary registered user is present around the non-contact power transmission device 100, the non-contact power transmission device 100 generates transmission power.

Hereinafter, the present embodiment will be described focusing on some of the configuration which are different from those of the fourth embodiment. The configuration of the non-contact power transmission device 100 of the present embodiment and the functional block of the control unit 117 thereof are basically the same as those of the fourth embodiment. Meanwhile, in the present embodiment, since an authentication target is a person, the processing at that point is different therefrom.

The preliminary information registration unit 451 according to the present embodiment is configured to register personal authentication information of a user in advance. In the present embodiment, for example, the user is prompted to input the personal authentication information via the display operation input unit 121, and the input from the user is accepted. The received personal authentication information is registered in the memory unit 118 as the registration information 459.

The matching unit 452 performs user authentication prior to generation of transmission power. In this embodiment, the matching unit 452 prompts the user to input the authentication information. Here, in the same manner as the case of preliminary registration processing, for example, the matching unit 452 prompts the user to input the personal authentication information via the display operation input unit 121. For example, the matching unit 452 generates an authentication information input screen to display on a liquid crystal panel, etc. of the display operation input.

Upon receiving the input of the authentication information, the matching unit 452 matches the authentication information with the registration information 459 so as to perform authentication. When they match each other, the authentication is considered successful, and when they do not match each other, the authentication is considered unsuccessful. Then, the matching unit 452 transmits an authentication result to the transmission power generation instruction unit 431.

[Transmission Power Generation Processing]

Figure 17:
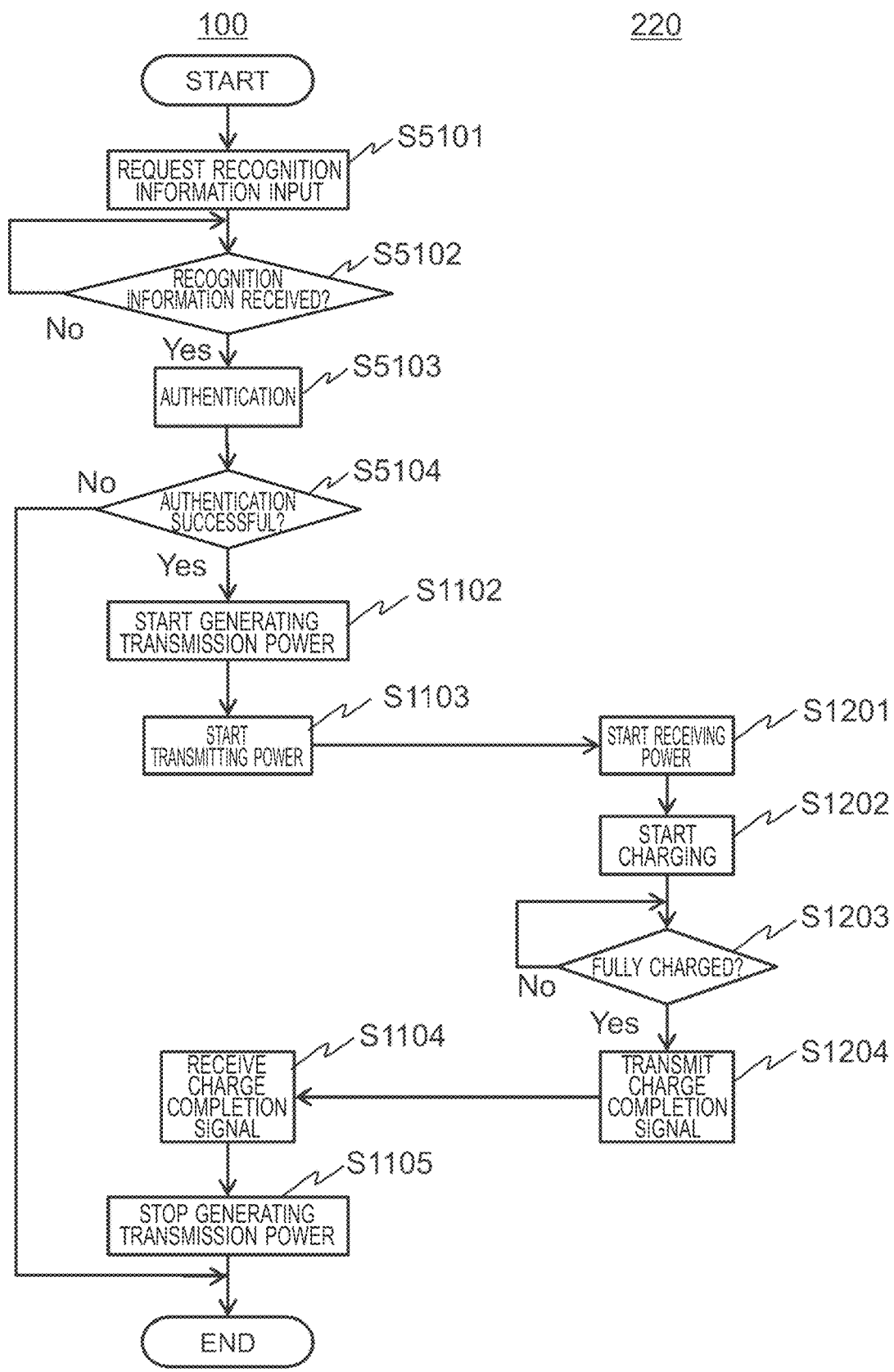
FIG. 17 illustrates a flowchart of transmission power generation processing according to a fifth embodiment.

Hereinafter, a transmission power generation processing flow performed by the control unit 117 according to the present embodiment, of which the preliminary registration processing has been completed, will be described with reference to FIG. 17.

First, the matching unit 452 requests an input of authentication information (step S5101). Here, for example, the authentication information input screen is generated to wait an input of the authentication information from the user.

Upon receiving the input of the authentication information via the signal reception unit 410 (step S5102) the matching unit 452 performs authentication (step S5103). When the authentication fails, the processing is ended as it is.

At this time, an error message may be generated and displayed on the display operation input unit 121, or may be output from the sound input/output processing unit 124.

On the other hand, when the authentication is successful, the matching unit 452 notifies the success of authentication to the transmission power generation instruction unit 431. Then, upon receiving the notification, the transmission power generation instruction unit 431 makes the transmission power generation unit 120 start generating transmission power (step S1102). Subsequent processes are the same as those of the first embodiment.

As described above, according to the present embodiment, when a user registered in advance is therearound, generation and transmission of power is performed. That is, the present embodiment is configured to confirm that the user is not a user who may cause a problem in use of the non-contact power transmission device 100, and then allow the non-contact power transmission device 100 to be used by the user.

With this configuration, for example, it is possible to prevent the non-contact power transmission device 100 from being used when a pacemaker wearer is present near the non-contact power transmission device 100. Furthermore, it is possible to prevent use by little children who are difficult to confirm safety of the use environment of the non-contact power transmission device 100. On the other hand, these users are not precluded from using the function of the bubble generator 220 in the bathtub 350. As a result, it is possible to provide the non-contact power transmission/reception system 101 which is high in safety and does not sacrifice convenience.

In the present embodiment, the user authentication result may be notified to the user. A notification method is the same as that of each of the embodiments described above.

The present embodiment also can be combined with each of the embodiments described above and their modifications.

Sixth Embodiment

A sixth embodiment of the present invention will be described. In the present embodiment, when a battery level of the non-contact power reception device 200 lowers, charging is automatically performed during a time period in which usually no person is present. Here, as preliminary information, a chargeable time is registered. In other words, in the present embodiment, depending on a device state at the non-contact power reception device 200 side, in a situation where there is a high possibility that no person 390 is present around the non-contact power transmission device 100, the non-contact power transmission device 100 generates transmission power.

The non-contact power transmission/reception system 101 according to the present embodiment basically has the same configuration as that of the fourth embodiment. Meanwhile, in the present embodiment, information to be registered in advance is different from the one as described above.

Hereinafter, the present embodiment will be described focusing on some of the configuration different from those of the fourth embodiment.

The preliminary information registration unit 451 of the present embodiment accepts registration of a chargeable time from the user in advance. The chargeable time is a time in which the non-contact power transmission device 100 can be operated. During this time, the non-contact power transmission device 100 is operated to generate transmission power.

Upon receiving a low battery level signal, which will be described later, from the non-contact power reception device 200 (bubble generator 220) side, the matching unit 452 according to the present embodiment matches the current time with the chargeable time to determine whether the current time is the chargeable time. Then, the matching unit 452 transmits a determination result to the transmission power generation instruction unit 431.

In the present embodiment, at the non-contact power reception device 200 (bubble generator 220) side, registration of a battery level threshold is accepted in advance and stored in the memory unit 218.

An input of the battery level threshold is accepted, for example, via a setting screen which is displayed on the display operation input unit 221.

The battery level threshold is a value used to start charging the battery 214, in other words, start generating power to be transmitted to the non-contact power transmission device 100 when the battery level becomes equal to or less than the threshold.

In each of the embodiment described above, the battery level detection unit 213 at the bubble generator 220 side has been described by referring to an example in which the battery level detection unit 213 is configured to output a charge completion signal when the battery 214 is fully charged. Meanwhile, in the present embodiment, the battery level detection unit 213 is configured to detect the battery level at predetermined time intervals and compares it with the battery level threshold for each detection. Then, when the detected battery level becomes equal to or less than the battery level threshold, the battery level detection unit 213 transmits the low battery level signal to the non-contact power transmission device 100.

[Transmission Power Generation Processing]

Figure 18:
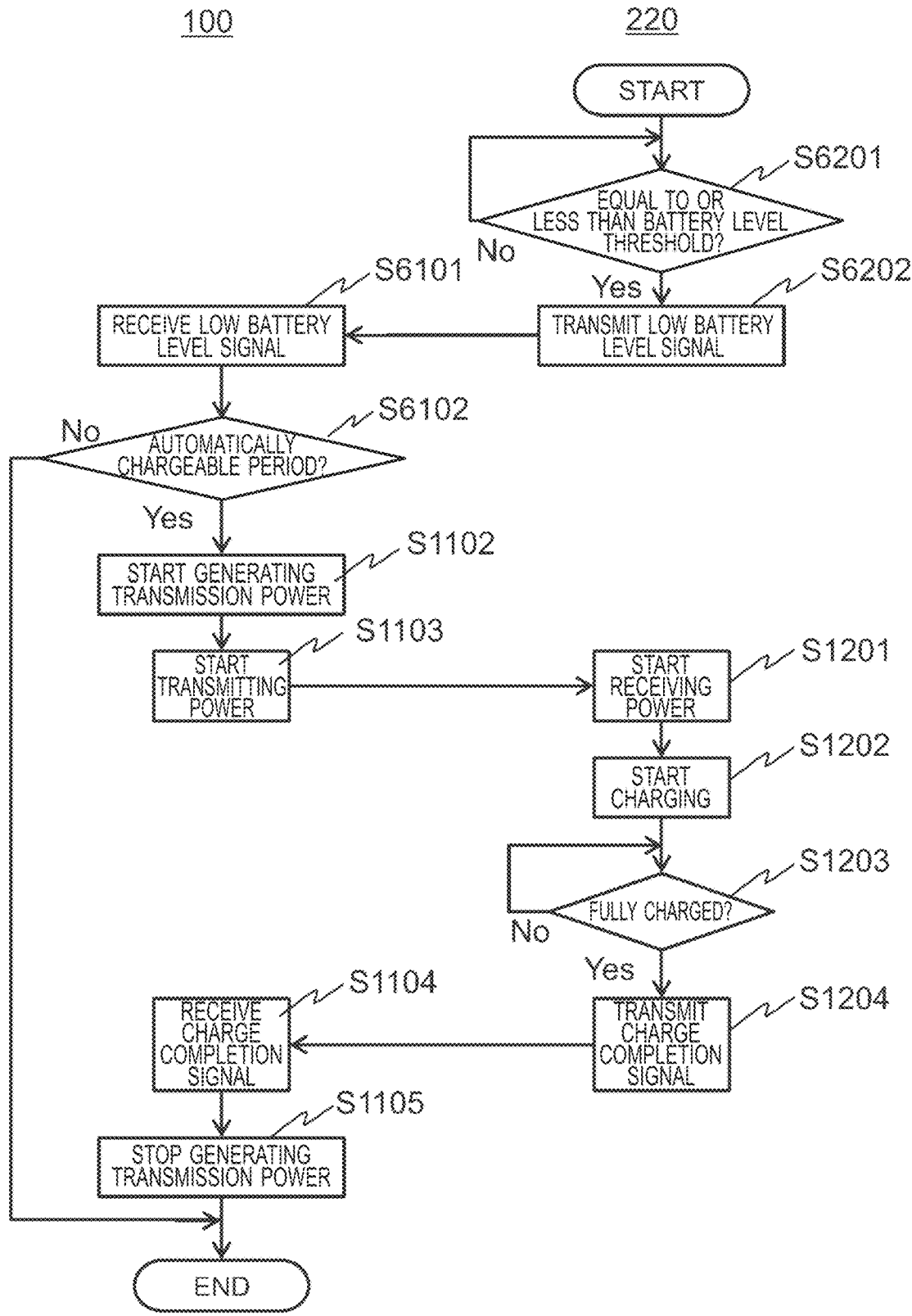
FIG. 18 illustrates a flowchart of transmission power generation processing according to a sixth embodiment.

Hereinafter, a transmission power generation processing flow performed by the control unit 117 according to the present embodiment, of which the preliminary registration processing has been completed, will be described with reference to FIG. 18.

In the present embodiment, at the bubble generator 220 side, the battery level detection unit 213 detects the battery level at predetermined time intervals and compares it with the battery level threshold which is registered in advance (step S6201). When the detected battery level becomes equal to or less than the battery level threshold, the battery level detection unit 213 generates the low battery level signal and transmits it to the non-contact power transmission device 100 via the near field communication unit 223 (step S6202).

Upon receiving the low battery level signal via the signal reception unit 410, the matching unit 452 matches the current time with a chargeable time to determine whether the current time is a time in which automatic charging is allowed (step S6102). When it does not correspond to the chargeable time, the processing is ended as it is.

At this time, an error message may be generated and displayed on the display operation input unit 121, or may be output from the sound input/output processing unit 124. In addition, it may be configured to wait up to the chargeable time.

On the other hand, when determining that the current time corresponds to the chargeable time, the matching unit 452 notifies a transmission power generation instruction to transmission power generation instruction unit 431. Then, upon receiving the notification, the transmission power generation instruction unit 431 makes the transmission power generation unit 120 start generating transmission power (step S1102). Subsequent processes are the same as those of the first embodiment.

As described above, according to the present embodiment, when the non-contact power reception device 200 requires charging of the battery 214 and when the current time corresponds to a time which is registered in advance as a chargeable time, the non-contact power transmission device 100 automatically generates transmission power and supplies it to the non-contact power reception device 200. That is, in the non-contact power reception device 200, charging is automatically performed. In particular, when a time in which the person 390 is not likely to be present near the non-contact power transmission device 100 is registered in advance as a chargeable time, it is possible to provide the non-contact power transmission/reception system 101 with high safety and usability.

The embodiment described above is configured that the battery level threshold is registered at the non-contact power reception device 200 side and the battery level is compared with the threshold at the non-contact power reception device 200 side. Meanwhile, the present invention is not limited thereto.

For example, the battery level threshold may be registered in the memory unit 118 at the non-contact power transmission device 100 side. At the non-contact power reception device 200 side, every time the battery level is detected, the battery level detection unit 213 transmits it to the non-contact power transmission device 100 via the near field communication unit 223. Then, the control unit 117 determines whether the battery level is equal to or less than the battery level threshold.

<Modification>

In the embodiment described above, the user sets a chargeable time. Meanwhile, the present invention is not limited to the method above. For example, the control unit 117 may be configured to, when the chargeable time is a time in which the person 390 is not likely to be near the non-contact power transmission device 100, learn and automatically set such a time zone.

Figure 19:
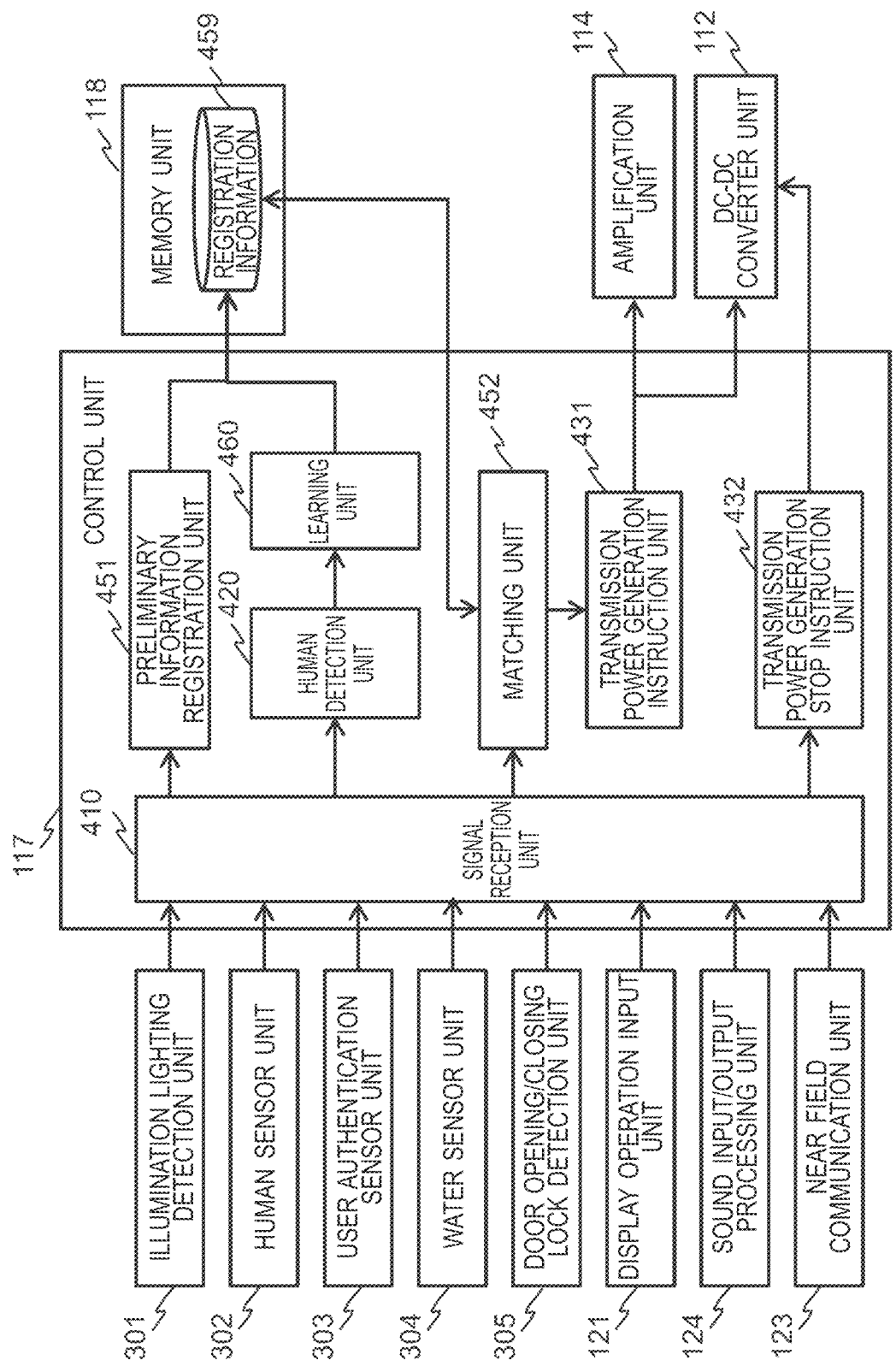
FIG. 19 is a function block diagram of a control unit of a modification of a sixth embodiment.

FIG. 19 illustrates a functional block of the control unit in the case above. In the present modification, the control unit includes the human detection unit 420 and a learning unit 460.

The human detection unit 420 is configured in the same manner as that of each embodiment. That is, the human detection unit 420 receives a signal from each detection unit and detects the presence or absence of the person 390 in the bathroom 330. In the present embodiment, at this time, the human detection unit 420 also acquires time information of a period in which the person 390 is not detected (absence period) and transmits it to the learning unit 460.

The learning unit 460 accumulates the time information of the absent period for each predetermined period, performs statistical processing, and calculates a chargeable period. In the present embodiment, for example, the learning unit 460 accumulates, by an hour in a day (24 hours), information as to whether the person 390 is absent in each time zone. Then, the learning unit 460 calculates (determines), as a chargeable period, a time period in which the person 390 is determined to be absent at a predetermined ratio or more from among the accumulated information.

With such a learning function, it is possible to realize the non-contact power transmission/reception system 101 with higher convenience.

<Modification>

The embodiments described above and their modifications have been described with an example in which the non-contact power transmission device 100 includes the illumination lighting detection unit 301, the human sensor unit 302, the user authentication sensor unit 303, and the door opening/closing lock detection unit 305. Meanwhile, the non-contact power reception device 200 may be configured to include these detection units and transmit detection signals to the non-contact power transmission device 100 by means of near field communication.

Furthermore, the illumination lighting detection unit 301, the human sensor unit 302, the user authentication sensor unit 303, and the door opening/closing lock detection unit 305 may be disposed at optimum positions in the bathroom 330 as devices which are separated from the non-contact power transmission device 100. In this case, each detection unit includes a near field communication unit, and is configured to transmit detection signals by each detection unit to the non-contact power transmission device 100 by means of near field communication.

Figure 20:
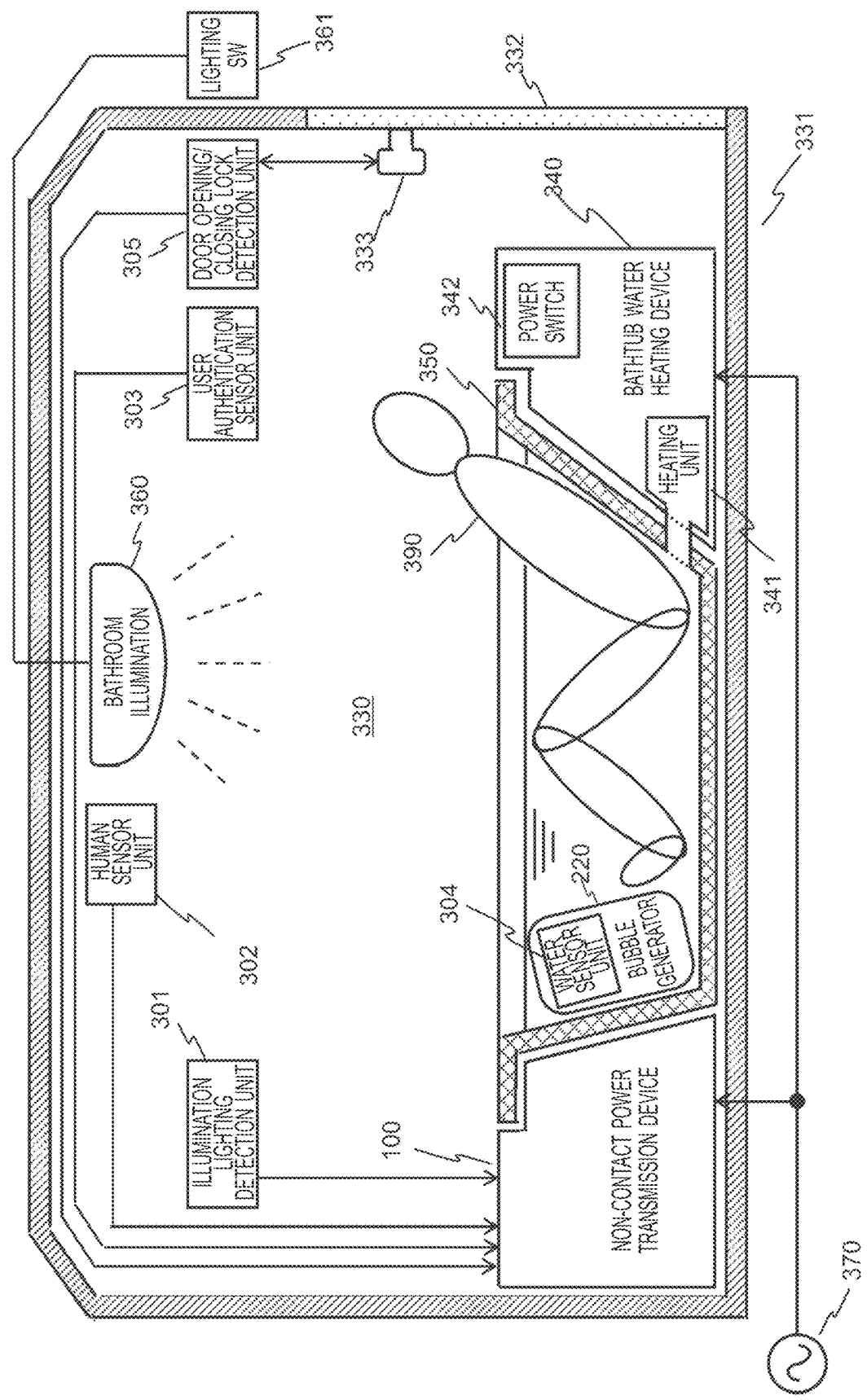
FIG. 20 explains an example of use of a non-contact power transmission/reception system according to a modification of the present invention.

As illustrated in FIG. 20, the water sensor unit 304 may be provided at the bubble generator 220 side. FIG. 20 schematically illustrates an example in which the water sensor unit 304 is provided at the bubble generator 220 side. In FIG. 20, the components illustrated in FIG. 1 and provided with the same reference signs have the same functions as those already described in FIG. 1. Accordingly, detailed explanation thereof will be omitted.

In the example illustrated in FIG. 20, a water immersion detection signal and a water temperature detection signal are generated by the water sensor unit 304 provided at the bubble generator 220 serving as a non-contact power reception device 200, and then transmitted to the non-contact power transmission device 100 by means of near field communication. With this configuration, it is possible to obtain the same operations and effects as those of each of the embodiments above which are described with reference to FIG. 1.

Still further, since the water sensor unit 304 is provided at the bubble generator 220 side, it is possible to accurately and reliably detect that the bubble generator 220 is immersed in water of the bathtub 350 and the water temperature.

In the present modification, a plurality of water sensor units 304 may be provided. With this configuration, it is possible to further improve detection accuracy of a state of the bubble generator 220 and the water temperature.

The embodiments described above and their modifications have been described with an example in which the bubble generator 220 generates bubbles in a bathtub as the non-contact power reception device 200. Meanwhile, the non-contact power reception device 200 is not limited thereto. For example, as long as the non-contact power reception device 200 is used in a bathroom and configured that the battery 214 in the device is charged by wireless power transfer, there is no restriction on the kind of the device. For example, it may be a massage device, a portable information terminal such as a smart phone, and beaty equipment such as an electric shaver, an epilator, a hair shaver, and an electric toothbrush. Some part of an embodiment and a modification may be further modified depending on whether it used in water, however, the same operations and effects can be obtained therefrom while having a difference only in an operation of the functional unit 215.

Figure 21:
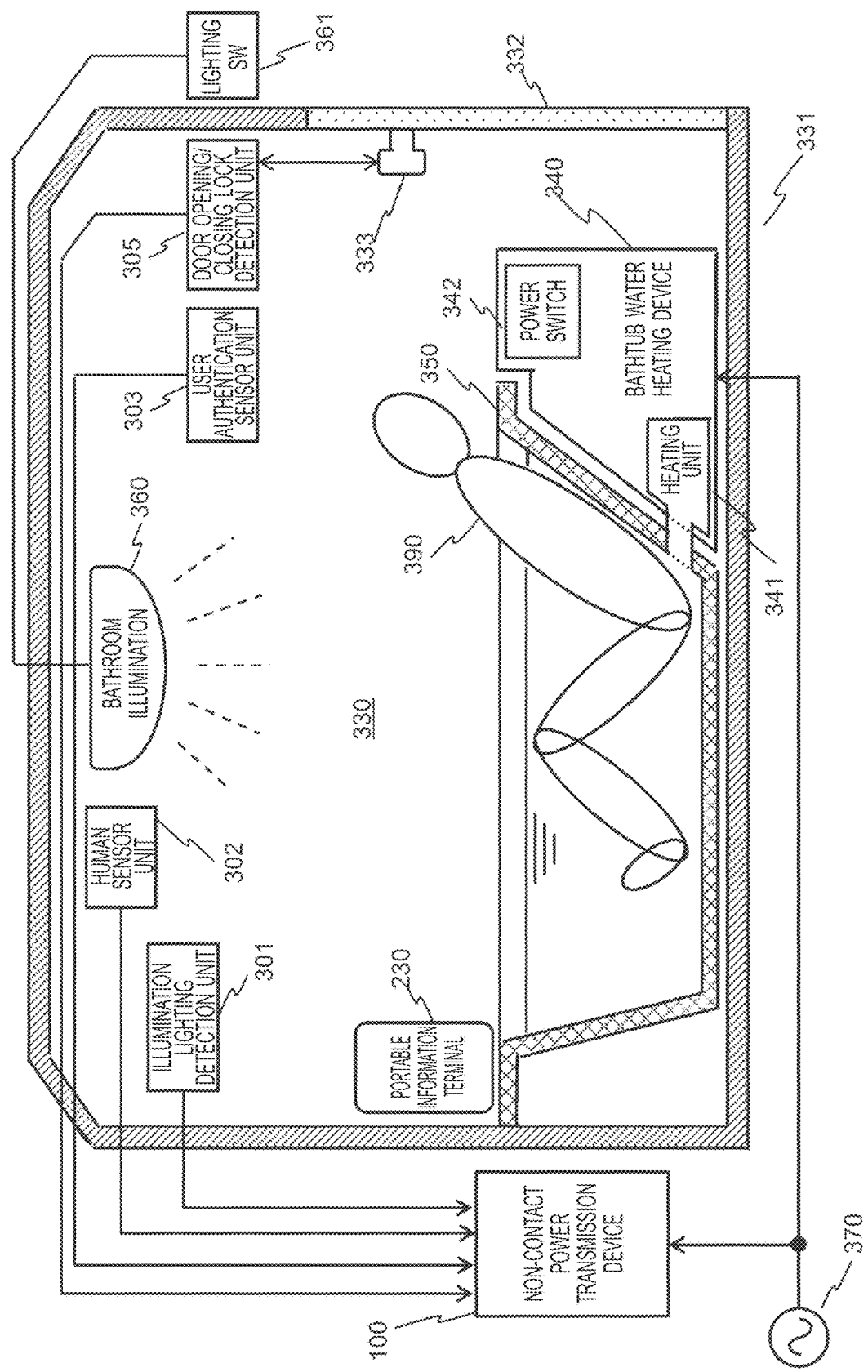
FIG. 21 explains an example of use of a non-contact power transmission/reception system according to a modification of the present invention.

FIG. 21 schematically illustrates an example in which a portable information terminal 230 such as a smart phone is used as the non-contact power reception device 200. In FIG. 21, the components illustrated in FIG. 1, FIG. 20, and FIG. 2 and provided with the same reference signs have the same functions as those already described in each of the drawings. Accordingly, detailed explanation thereof will be omitted.

FIG. 21 illustrates a case where, for example, the non-contact power transmission device 100 is installed outside the bathroom 330. In this case, the portable information terminal 230 is disposed, for example, at one end of the bathtub 350. Then, the portable information terminal 230 is wirelessly transferred with power from the non-contact power transmission device 100 disposed outside the bathroom 330 via the bathroom wall surface 331 so that the battery 214 is charged. In this case, the portable information terminal 230 may be disposed in the wireless power transfer area of the non-contact power transmission device 100.

According to the illustrated example, the portable information terminal 230 can be freely used in the bathroom 330 without any arrangement constraints while the battery 214 is charged by wireless power transfer. For example, the user may hold and operate the portable information terminal 230 by hand while the battery 214 is charged. With this configuration, the user can use the portable information terminal 230 without worrying about the battery level, thereby greatly improving the usability of the portable information terminal 230.

Figure 22:
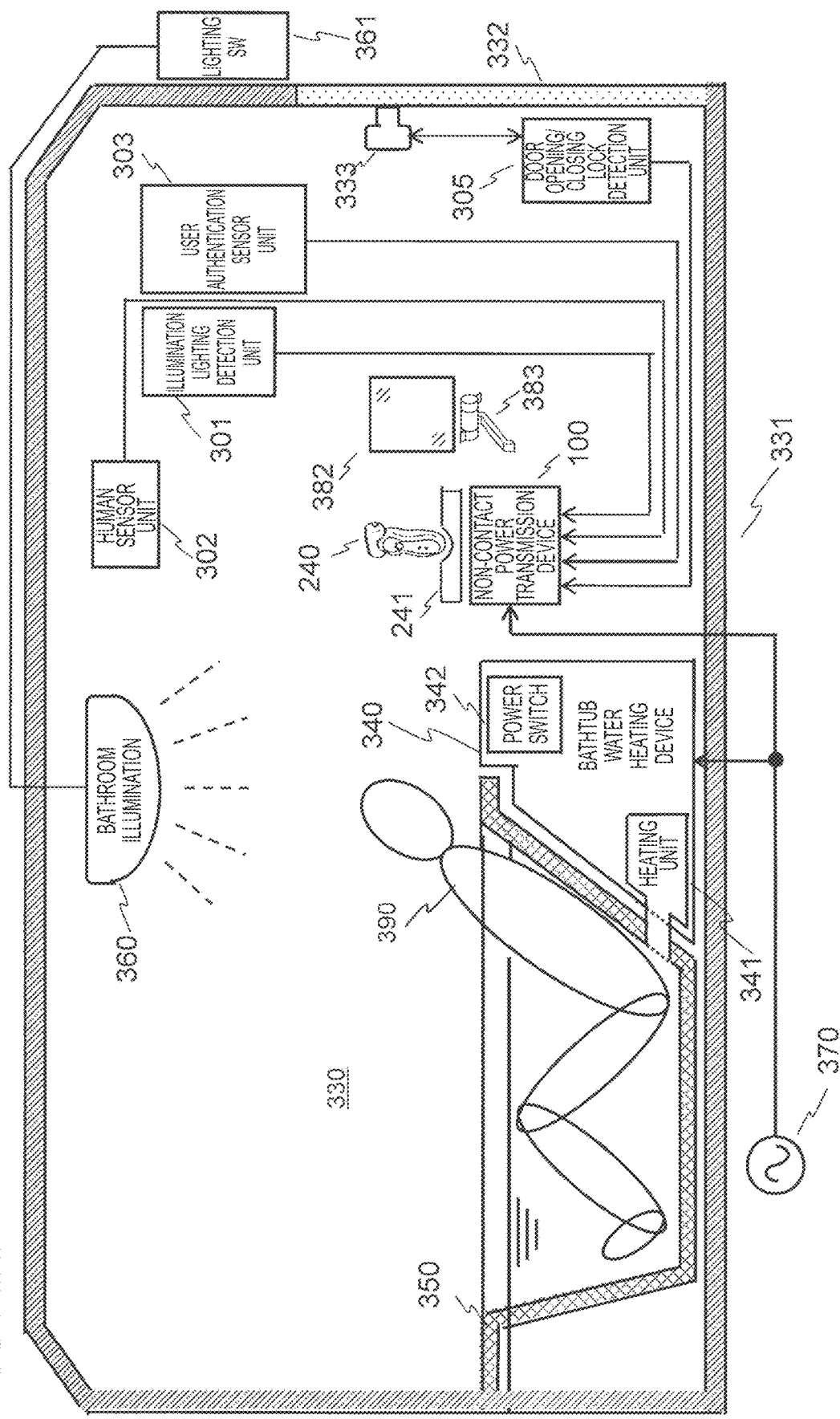
FIG. 22 explains an example of use of a non-contact power transmission/reception system according to a modification of the present invention.

FIG. 22 schematically illustrates an example in which an electric shaver 240 is used as the non-contact power reception device 200. In FIG. 22, the components illustrated in FIG. 1, FIG. 20, and FIG. 2 and provided with the same reference signs have the same functions as those already described in each of the drawings. Accordingly, detailed explanation thereof will be omitted.

As illustrated in FIG. 22, the electric shaver 240 is placed on a stand 241 prior to use, and is wirelessly transferred with power from the non-contact power transmission device 100 via the stand 241 so that the battery 214 is charged. The non-contact power transmission device 100 may be disposed, for example, next to a mirror 382 or a faucet 383 in the bathroom 330.

In this case, when the electric shaver 240 is within the wireless power transfer area of the non-contact power transmission device 100, the function of the electric shaver 240 can be used without worrying about the battery level while the battery is charged by wireless power transfer. With this configuration, the usability of the electric shaver 240 can be improved.

In this connection, when the non-contact power reception device 200 is the portable information terminal 230 or the electric shaver 240, the transmission power generation processing of the non-contact power transmission device 100 may include a process of mislaying prevention.

For example, the non-contact power transmission device 100 may be configured to detect whether the non-contact power reception device 200 is mislaid after charging is completed, when the user leaves the bathroom 330 and thus absent in the bathroom 330. Whether the user is absent is detected by the human detection unit 420 as described above.

The non-contact power transmission device 100 transmits a presence confirmation signal to the non-contact power reception device 200 by using a near field communication function so as to detect whether the non-contact power reception device 200 is present in the bathroom 330. When receiving the presence confirmation signal from another device, the non-contact power reception device 200 makes a reply to another device which is a transmission source.

The control unit 117 of the non-contact power transmission device 100 determines that the device is present in the bathroom 330 when the non-contact power transmission device 100 receives the reply to the transmitted presence confirmation signal.

The control unit 117 of the non-contact power transmission device 100 determines mislaying occurs when charging is completed, when the non-contact power reception device 200 is present therearound, and when it is determined that the person 390 is absent. Then, the control unit 117 outputs a warning.

Here, the warning to be output is, for example, includes displaying a warning on the display operation input unit 121 of the non-contact power transmission device 100, outputting a sound notification from the sound input/output processing unit 124, displaying a warning on the display operation input unit 221 of the non-contact power reception device 200, and outputting a sound notification from the sound input/output processing unit 224.

When the non-contact power reception device 200 is the portable information terminal 230, the control unit 117 may be configured to send a notification to the portable information terminal 230 by an e-mail, etc. In this case, the non-contact power transmission device 100 stores an e-mail address, etc. of a device to be supplied with power as the registration information 459 in advance.

Furthermore, the embodiments described above and their modifications have been described with an example in which inductive coupling is used as a method of wireless power transfer (non-contact power transmission), meanwhile, the wireless power transfer is not limited thereto. For example, it may be a method such as by magnetic field resonance or microwave power transfer.

It should be noted that the present invention is not limited to the embodiments described above and their modifications, and various modified examples are included. For example, the embodiments described above and their modifications are intended to be provided to explain the present invention in a way that is easy to understand, and not necessarily limited to those having all the configurations described above. In addition, it is possible to replace a part of the configuration of one embodiment with the configuration of another embodiment, and it is also possible to add the configuration of one embodiment to the configuration of another embodiment. Furthermore, it is possible to add, delete, and replace a part of the configuration of each embodiment.

Still further, each of the above-described configurations, functions, processing units, processing means, etc. may be partially or entirely implemented in hardware by, for example, designing an integrated circuit. The above-described configurations and functions may be realized by software in which programs used to realize each function by a processor are interpreted and executed. Information of such as programs, tables, and files that realize each function can be stored in the memory unit 118, the memory unit 218, a recording device such as a hard disk or an SSD (Solid State Drive), or a recording medium such as an IC card, an SD card, or a DVD.

Still further, the control lines and the information lines which are considered to be necessary for the purpose of explanation are indicated herein, and not all the control lines and the information lines of actual products are necessarily indicated. It may be considered that almost all the configurations are actually connected to each other.

REFERENCE SIGNS LIST

100: non-contact power transmission device, 101: non-contact power transmission/reception system, 111: rectifier unit, 112: DC-DC converter unit, 113: resonance frequency generation unit, 114: amplification unit, 115: transmission power generation amplification unit, 116: power transfer coil, 117: control unit, 117*c*: CPU, 117*r*: RAM, 118: memory unit, 120: transmission power generation unit, 121: display operation input unit, 122: communication unit, 123: near field communication unit, 124: sound input/output processing unit, 125: transmission/reception antenna, 129: bus

200: non-contact power reception device, 211: rectifier unit, 212: DC voltage current supply unit, 213: battery level detection unit, 214: battery, 215: functional unit, 216: power receiving coil, 217: control unit, 217*c*: CPU, 217*r*: RAM, 218: memory unit, 220: bubble generator, 221: display operation input unit, 222: communication unit, 223: near field communication unit, 224: sound input/output processing unit, 225: transmission/reception antenna, 229: bus, 230: portable information terminal, 240: electric shaver, 241: stand

301: illumination lighting detection unit, 302: human sensor unit, 303: user authentication sensor unit, 304: water sensor unit, 305: door opening/closing lock detection unit, 330: bathroom, 331: bathroom wall surface, 332: bathroom door, 333: door knob, 340: bathtub water heating device, 341: heating unit, 342: power switch, 350: bathtub, 360: bathroom illumination, 361: lighting SW, 370: commercial power source, 382: mirror, 383: faucet, 390: person

410: signal reception unit, 420: human detection unit, 431: transmission power generation instruction unit, 432: transmission power generation stop instruction unit, 440: power determination unit, 451: preliminary information registration unit, 452: matching unit, 459: registration information, 460: learning unit

The invention claimed is:

1. A non-contact power transmission device that wirelessly transfers generated transmission power to a port-contact power reception device, the non-contact power transmission device comprising:
a transmission power generator configured to perform generation of the transmission power; and
control circuitry configured to
control the of transmission power generator to generate the transmission power in accordance with a surrounding environment in which at least one of the non-contact power transmission device and the non-contact power reception device is arranged, or at least one of a state of the non-contact power transmission device and a state of the non-contact power reception device:
accumulate a period in which a person is detected around the non-contact power reception device;
determine a chargeable period based on the period;
in a case that a low battery level signal is received from the non-contact power reception device, control the transmission power generator to generate the transmission power, wherein the low battery level signal indicates that a battery level of the non-contact power reception device is equal to or lower than a predetermined threshold;
in a case that a current time corresponds to the chargeable period, control the transmission power generator to generate the transmission power; and
when the current time does not correspond to the chargeable period, control the transmission power generator to not generate the transmission power.

2. The non-contact power transmission device according to claim 1, wherein the control circuitry is further configured to control the transmission power generator to generate the transmission power in a case that a person is detected in a predetermined range around the non-contact power transmission device.

3. The non-contact power transmission device according to claim 2, wherein the control circuitry is further configured to determine that the person is detected in a case that a human detection signal is received from a human sensor configured to output the human detection signal when the person is detected in the range.

4. The non-contact power transmission device according to claim 3, wherein the control circuitry is further configured to control the transmission power generator to stop the generation of the transmission power in a case of that the person is not detected in the range in a predetermined period after the generation of the transmission power is started.

5. The non-contact power transmission device according to claim 2, wherein the control circuitry is further configured to determine that the person is detected in a case that an illumination lighting detection signal is received from an illumination lighting sensor configured to output the illumination lighting detection signal when an illumination is turned on in the range.

6. The non-contact power transmission device according to claim 2, wherein the control circuitry is further configured to determine that the person is detected in a case that an illumination lighting detection signal is received from an illumination lighting sensor configured to output the illumination lighting detection signal when an illumination is turned on in the range, as well as in a case that a door opening/closing detection signal is received, from a door opening/closing lock sensor configured to output the door opening/closing detection signal when a door opening/closing operation is made to enter the range.

7. The non-contact power transmission device according to claim 2, wherein the control circuitry is further configured to determine that the person is detected in a case that an illumination lighting detection signal is received from an illumination lighting sensor configured to output the illumination lighting detection signal when an illumination is turned on in the range, as well as in a case that a human detection signal is received from a human detection sensor configured to output the human detection signal when the person is detected in the range.

8. The non-contact power transmission device according to claim 2, the control circuitry is further configured to determine that the person is detected in a case that a lock detection signal is received from a door opening/closing lock sensor configured to output the lock detection signal when a door lock operation is made to enter the range.

9. The non-contact power transmission device according to claim 8, wherein the control circuitry is further configured to, after the generation of the transmission power is started, control the transmission power generator to stop the generation of the transmission power in a case that an unlock detection signal is received from the door opening/closing lock sensor when a door unlocking operation is made.

10. The non-contact power transmission device according to claim 2, wherein the control circuitry is further configured to control, in a case that the person is not detected to be in the range, the transmission power generator to generate the transmission power having higher power than transmission power which is generated in a case that the person is detected.

11. The non-contact power transmission device according to claim 1, wherein the control circuitry is further configured to change a level of the transmission power to be generated by the transmission power generator in accordance with a cooling environment of the non-contact power reception device.

12. The non-contact power transmission device according to claim 1, further comprising:
a memory to store identification information of the non-contact power reception device which is a target of power transfer in advance, wherein
the control circuitry is further configured to control the transmission power generator to generate the transmission power when the non-contact power reception device, of which the identification information is stored in the memory, is present around the non-contact power transmission device.

13. The non-contact power transmission device according to claim 1, further comprising:
a memory to store authentication information of a user in advance, wherein
the control circuitry is further configured to control the transmission power generator to generate the transmission power when a user, of which the authentication information is stored in the memory, is present around the non-contact power transmission device.

14. A non-contact power transmission/reception system comprising:
the non-contact power transmission device according to claim 1; and
the non-contact power reception device, wherein
the non-contact power reception device includes:
a battery that is charged with transmission power transferred from the non-contact power transmission device; and
a battery level detector configured to detect a battery level of the battery, and transmit the low battery level signal to the non-contact power transmission device in a case that the battery level is equal to or lower than the predetermined threshold.

* * * * *